United States Patent
Bergström et al.

(10) Patent No.: US 12,369,215 B2
(45) Date of Patent: Jul. 22, 2025

(54) METHODS AND APPARATUS FOR MANAGING SCELL STATE DURING UE SUSPEND/RESUME

(71) Applicant: Telefonaktiebolaget LM Ericsson (publ), Stockholm (SE)

(72) Inventors: Mattias Bergström, Sollentuna (SE); Icaro L. J. Da Silva, Solna (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 455 days.

(21) Appl. No.: 17/425,815

(22) PCT Filed: Jan. 31, 2020

(86) PCT No.: PCT/SE2020/050081
§ 371 (c)(1),
(2) Date: Jul. 26, 2021

(87) PCT Pub. No.: WO2020/167203
PCT Pub. Date: Aug. 20, 2020

(65) Prior Publication Data
US 2022/0167451 A1 May 26, 2022

Related U.S. Application Data

(60) Provisional application No. 62/805,357, filed on Feb. 14, 2019.

(51) Int. Cl.
*H04W 76/19* (2018.01)
*H04W 24/10* (2009.01)
(Continued)

(52) U.S. Cl.
CPC .......... *H04W 76/19* (2018.02); *H04W 24/10* (2013.01); *H04W 76/34* (2018.02); *H04W 88/02* (2013.01); *H04W 88/08* (2013.01)

(58) Field of Classification Search
CPC ..... H04W 76/19; H04W 24/10; H04W 76/34; H04W 88/02; H04W 88/08
See application file for complete search history.

(56) References Cited

U.S. PATENT DOCUMENTS

2016/0219503 A1   7/2016  Kim et al.
2017/0223763 A1   8/2017  Rahman et al.
(Continued)

FOREIGN PATENT DOCUMENTS

CN   107006051 A   8/2017
CN   105532043 A   5/2019
(Continued)

OTHER PUBLICATIONS

"3GPP TS 23.501 V15.4.0", 3rd Generation Partnership Project; Technical Specification Group Services and System Aspects; System Architecture for the 5G System; Stage 2 (Release 15), Dec. 2018, pp. 1-236.
(Continued)

*Primary Examiner* — Omar J Ghowrwal
(74) *Attorney, Agent, or Firm* — Murphy, Bilak & Homiller, PLLC

(57) ABSTRACT

Embodiments include methods performed by a user equipment (UE), for managing the UE's secondary serving cells (SCells) in a wireless network. Such methods include receiving, from a first network node, a message to suspend a connection with the first network node. The connection is via a plurality of configured cells including a primary serving cell (PCell) and one or more SCells, which have respective first SCell states. Such methods also include suspending the connection in response to the suspend message. Such methods also include receiving, from the first network node or a second network node, a message to resume the connection. The resume message includes indication of indication of second SCell states for one or more (Continued)

of the following: the one or more SCells, and one or more further SCells to be added to the configured cells more SCells, and one or more further SCells to be added to the configured cells upon resuming the connection. Embodiments also include complementary methods performed by a wireless network.

15 Claims, 16 Drawing Sheets

(51) Int. Cl.
*H04W 76/34* (2018.01)
*H04W 88/02* (2009.01)
*H04W 88/08* (2009.01)

(56) References Cited

U.S. PATENT DOCUMENTS

| | | | |
|---|---|---|---|
| 2018/0110082 A1 | 4/2018 | Saily et al. | |
| 2018/0199163 A1* | 7/2018 | Chen | H04W 48/14 |
| 2019/0037634 A1* | 1/2019 | Kadiri | H04W 12/00 |

FOREIGN PATENT DOCUMENTS

| | | |
|---|---|---|
| CN | 107959983 B | 1/2022 |
| WO | 2019022901 A1 | 1/2019 |

OTHER PUBLICATIONS

"3GPP TS 33.401 V15.6.0", 3rd Generation Partnership Project; Technical Specification Group Services and System Aspects; 3GPP System Architecture Evolution (SAE); Security architecture (Release 15), Dec. 2018, pp. 1-163.

"3GPP TS 38.331 V15.4.0", 3rd Generation Partnership Project; Technical Specification Group Radio Access Network; NR; Radio Resource Control (RRC) protocol specification (Release 15), Dec. 2018, pp. 1-474.

"Addition of RRC suspend resume for SCell in euCA", 3GPP TSG-WG2 Meeting #102, R2-1808166, Busan, Republic of Korea, May 21-25, 2018, pp. 1-54.

"Addition of RRC suspend resume for SCell in euCA", 3GPP TSG-WG2 Meeting #102, R2-1808810, Busan, Republic of Korea, May 21-25, 2018, pp. 1-62.

"RRC Suspend Resume CA establishment", 3GPP TSG-RAN WG2 #102, Tdoc R2-1808165, Busan, Republic of xKorea, Revision of R2-1805829, May 21-25, 2018, pp. 1-2.

"3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, pp. 1-918.

"3GPP TS 38.304 V15.2.0", 3rd Generation Partnership Project; Technical Specification Group Radio Access Network; NR; User Equipment (UE) procedures in Idle mode and RRC Inactive state (Release 15), Dec. 2018, pp. 1-28.

"3GPP TS 38.401 V15.4.0", 3rd Generation Partnership Project; Technical Specification Group Radio Access Network; NG-RAN; Architecture description (Release 15), Dec. 2018, pp. 1-40.

"3GPP TS 38.133 V15.4.0", 3rd Generation Partnership Project; Technical Specification Group Radio Access Network; NR; Requirements for support of radio resource management (Release 15), Dec. 2018, pp. 1-876.

"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.

* cited by examiner

FIG. 7

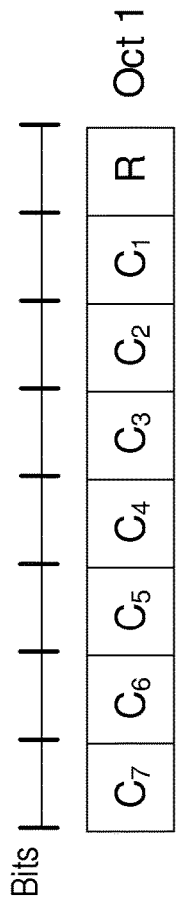

Bits

| C₇ | C₆ | C₅ | C₄ | C₃ | C₂ | C₁ | R | Oct 1 |

FIG. 8

```
-- ASN1START

RRCConnectionReconfiguration ::=    SEQUENCE {
    rrc-TransactionIdentifier       RRC-TransactionIdentifier,
    criticalExtensions              CHOICE {
        c1                          CHOICE{
            rrcConnectionReconfiguration-r8  RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}
...
sCellToAddMod-r10 ::=               SEQUENCE {
    sCellIndex-r10                      SCellIndex-r10,
    cellIdentification-r10              SEQUENCE {
        physCellId-r10                      PhysCellId,
        dl-CarrierFreq-r10                  ARFCN-ValueEUTRA
    }                                   OPTIONAL, -- Cond SCellAdd radioResourceConfigCommonSCell-r10      RadioResourceConfigCommonSCell-r10 OPTIONAL,     -- Cond SCellAdd
    radioResourceConfigDedicatedSCell-r10   RadioResourceConfigDedicatedSCell-r10 OPTIONAL,  -- Cond SCellAdd2
...,
[[  dl-CarrierFreq-v1090                ARFCN-ValueEUTRA-v9e0 OPTIONAL     -- Cond EARFCN-max
]],
[[  antennaInfoDedicatedSCell-v10i0     AntennaInfoDedicated-v10i0 OPTIONAL  -- Need ON
]],
[[  srs-SwitchFromServCellIndex-r14     INTEGER (0..31) OPTIONAL           -- Need ON
]],
[[  sCellState-r15                      ENUMERATED {activated, dormant} OPTIONAL  -- Need ON
]]
}
```

```
-- ASN1START
-- TAG-CELL-GROUP-CONFIG-START
-- Configuration of one Cell-Group:
CellGroupConfig ::=          SEQUENCE {
    cellGroupId                  CellGroupId,
    rlc-BearerToAddModList       SEQUENCE (SIZE(1..maxLC-ID)) OF RLC-BearerConfig        OPTIONAL,   -- Need N
    rlc-BearerToReleaseList      SEQUENCE (SIZE(1..maxLC-ID)) OF LogicalChannelIdentity  OPTIONAL,   -- Need N
    mac-CellGroupConfig          MAC-CellGroupConfig                                     OPTIONAL,   -- Need M
    physicalCellGroupConfig      PhysicalCellGroupConfig                                 OPTIONAL,   -- Need M
    spCellConfig                 SpCellConfig                                            OPTIONAL,   -- Need M
    sCellToAddModList            SEQUENCE (SIZE (1..maxNrofSCells)) OF SCellConfig       OPTIONAL,   -- Need N
    sCellToReleaseList           SEQUENCE (SIZE (1..maxNrofSCells)) OF SCellIndex        OPTIONAL,   -- Need N
    ...,
    [[
    reportUplinkTxDirectCurrent-v1530    ENUMERATED {true}                               OPTIONAL    -- Cond BWP-Reconfig
    ]]
}, SCellConfig ::=              SEQUENCE {
    sCellIndex                   SCellIndex,
    sCellConfigCommon            ServingCellConfigCommon                                 OPTIONAL,   -- Cond SCellAdd
    sCellConfigDedicated         ServingCellConfig                                       OPTIONAL,   -- Cond SCellAddMod
    ...,
    [[
    smtc                         SSB-MTC                                                 OPTIONAL    -- Need S
    ]]
}
-- TAG-CELL-GROUP-CONFIG-STOP
-- ASN1STOP
```

FIG. 9

```
RRCResume-IEs ::=             SEQUENCE {
    radioBearerConfig         RadioBearerConfig                                           OPTIONAL,  -- Need M
    masterCellGroup           OCTET STRING (CONT. CellGroupConfig)                        OPTIONAL,  -- Need M
    measConfig                MeasConfig                                                  OPTIONAL,  -- Need M
    fullConfig                ENUMERATED {true}                                           OPTIONAL,  -- Need N
    lateNonCriticalExtension  OCTET STRING                                                OPTIONAL,
    sCellInitialStates        SEQUENCE (SIZE (15)) OF ENUMERATED{activated, deactivated, dormant}  OPTIONAL,  -- Need N
    nonCriticalExtension      SEQUENCE{}
}
```

FIG. 10

```
RRCResume-IEs ::=             SEQUENCE {
    radioBearerConfig         RadioBearerConfig                          OPTIONAL,  -- Need M
    masterCellGroup           OCTET STRING (CONT. CellGroupConfig)       OPTIONAL,  -- Need M
    measConfig                MeasConfig                                 OPTIONAL,  -- Need M
    fullConfig                ENUMERATED {true}                          OPTIONAL,  -- Need N
    lateNonCriticalExtension  OCTET STRING                               OPTIONAL,
    sCellsToActivate          BIT STRING (SIZE (15))                     OPTIONAL,  -- Need N
    sCellsToDeactivate        BIT STRING (SIZE (15))                     OPTIONAL,  -- Need N
    sCellsToHibernate         BIT STRING (SIZE (15))                     OPTIONAL,  -- Need N
    nonCriticalExtension      SEQUENCE{}                                 OPTIONAL
}
```

FIG. 11

```
RRCResume-IEs ::=             SEQUENCE {
    radioBearerConfig         RadioBearerConfig                          OPTIONAL,  -- Need M
    masterCellGroup           OCTET STRING (CONT. CellGroupConfig)       OPTIONAL,  -- Need M
    measConfig                MeasConfig                                 OPTIONAL,  -- Need M
    fullConfig                ENUMERATED {true}                          OPTIONAL,  -- Need N
    lateNonCriticalExtension  OCTET STRING                               OPTIONAL,
    sCellsToActivate          BIT STRING (SIZE (15))                     OPTIONAL,  -- Need N
    sCellsToHibernate         BIT STRING (SIZE (15))                     OPTIONAL,  -- Need N
    nonCriticalExtension      SEQUENCE{}                                 OPTIONAL
}
```

FIG. 12

```
-- ASN1START
-- TAG-CELL-GROUP-CONFIG-START
-- Configuration of one Cell-Group:
CellGroupConfig ::=        SEQUENCE {
    cellGroupId                CellGroupId,
    rlc-BearerToAddModList     SEQUENCE (SIZE(1..maxLC-ID)) OF RLC-BearerConfig       OPTIONAL,  -- Need N
    rlc-BearerToReleaseList    SEQUENCE (SIZE(1..maxLC-ID)) OF LogicalChannelIdentity OPTIONAL,  -- Need N
    mac-CellGroupConfig        MAC-CellGroupConfig                                    OPTIONAL,  -- Need M
    physicalCellGroupConfig    PhysicalCellGroupConfig                                OPTIONAL,  -- Need M
    spCellConfig               SpCellConfig                                           OPTIONAL,  -- Need M
    sCellToAddModList          SEQUENCE (SIZE (1..maxNrofSCells)) OF SCellConfig      OPTIONAL,  -- Need N
    sCellToReleaseList         SEQUENCE (SIZE (1..maxNrofSCells)) OF SCellIndex       OPTIONAL,  -- Need N
    ...,
    [[
    reportUplinkTxDirectCurrent-v1530  ENUMERATED {true}                              OPTIONAL   -- Cond BWP-Reconfig
    ]]
}
...
SCellConfig ::=        SEQUENCE {
    sCellIndex             SCellIndex,
    sCellConfigCommon      ServingCellConfigCommon                      OPTIONAL,  -- Cond SCellAdd
    sCellConfigDedicated   ServingCellConfig                            OPTIONAL,  -- Cond SCellAddMod
    ...,
    [[
    smtc                   SSB-MTC                                      OPTIONAL,  -- Need S
    ]],
    [[
    sCellState-r16         ENUMERATED {activated, dormant}  OPTIONAL   -- Need ON
    ]]
}
-- TAG-CELL-GROUP-CONFIG-STOP
-- ASN1STOP
```

FIG. 13

```
RRCResume-IEs ::=          SEQUENCE {
    radioBearerConfig      RadioBearerConfig            OPTIONAL,  -- Need M
    masterCellGroup        OCTET STRING (CONT. CellGroupConfig)
                                                        OPTIONAL,  -- Need M
    measConfig             MeasConfig                   OPTIONAL,  -- Need M
    fullConfig             ENUMERATED {true}            OPTIONAL,  -- Need N
    lateNonCriticalExtension OCTET STRING               OPTIONAL,
    sCellPreviousState     ENUMERATED {true}            OPTIONAL,  -- Need N
    nonCriticalExtension   SEQUENCE{}                   OPTIONAL
}
```

FIG. 14

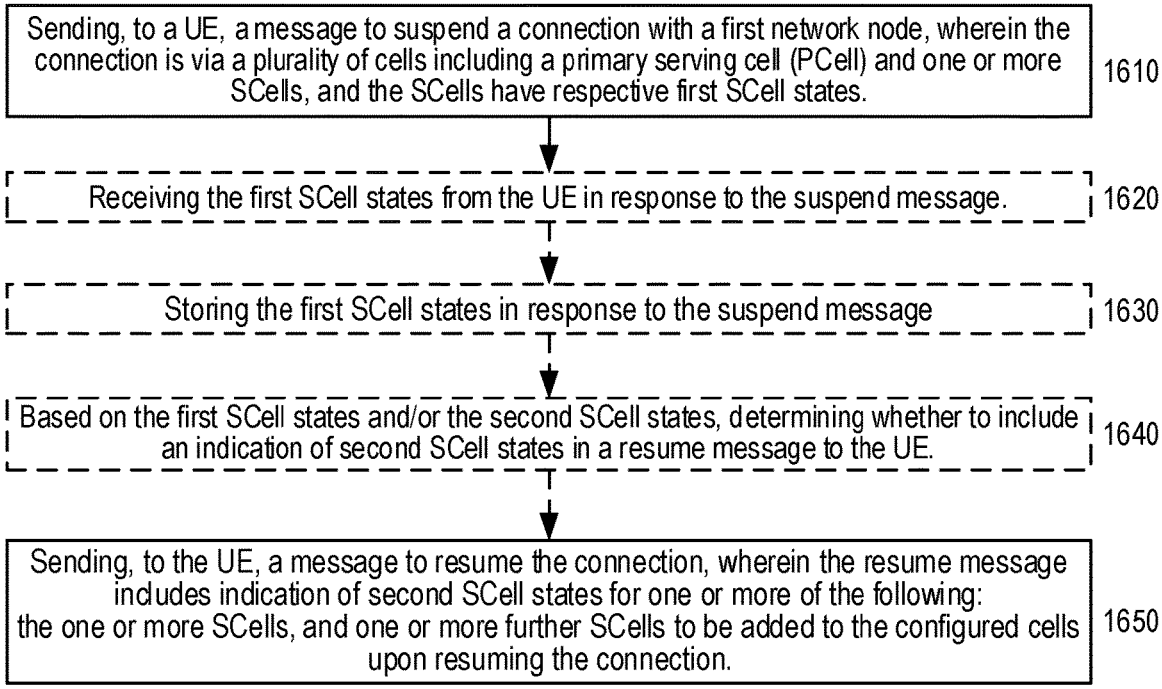

FIG. 16

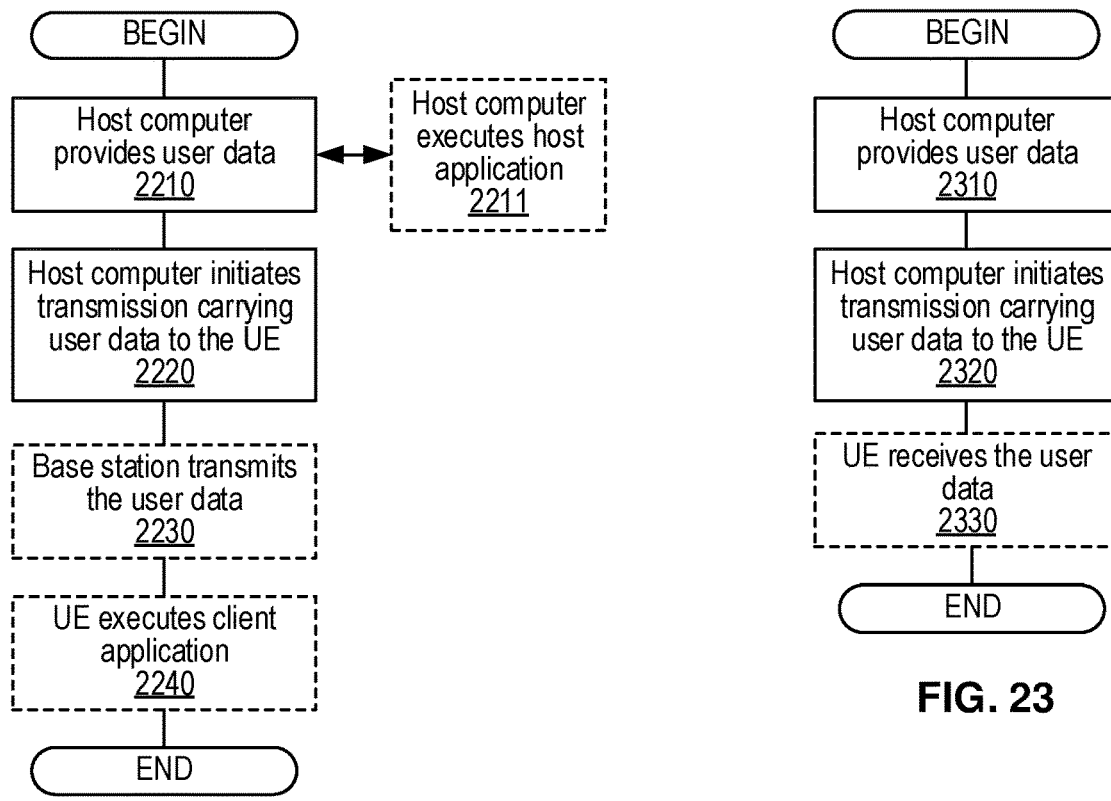
FIG. 22
FIG. 23
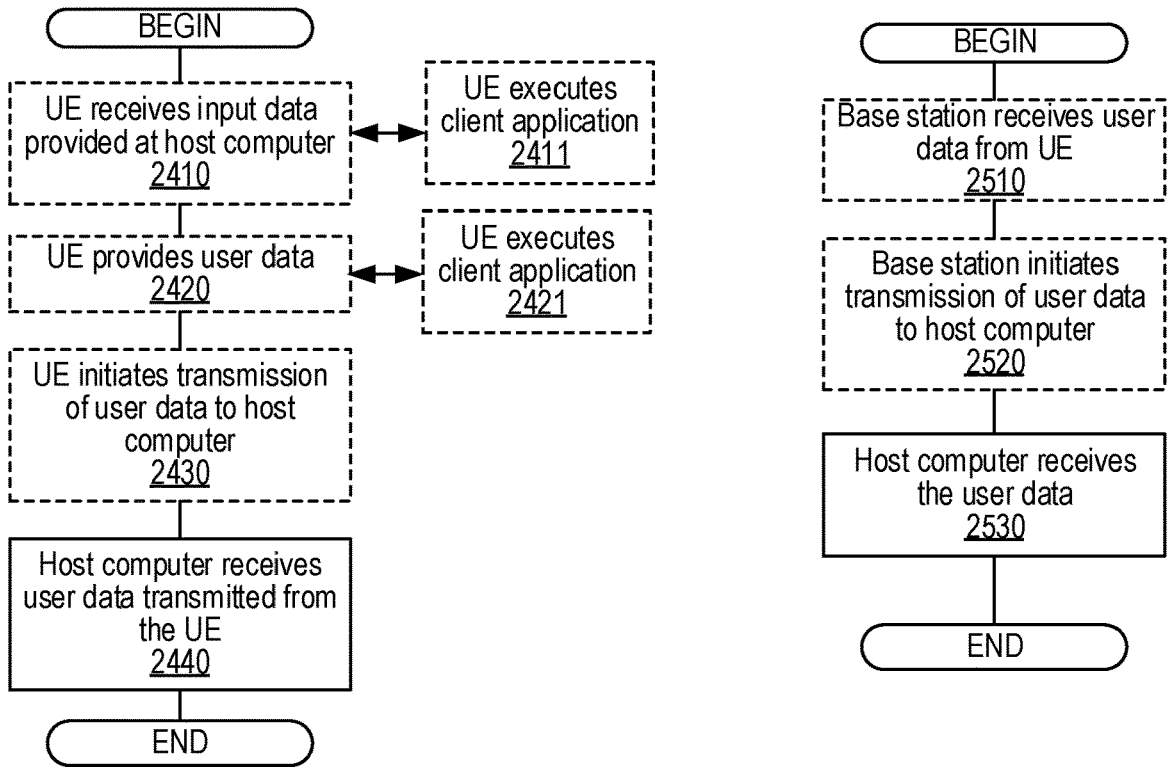
FIG. 24
FIG. 25

METHODS AND APPARATUS FOR MANAGING SCELL STATE DURING UE SUSPEND/RESUME

TECHNICAL FIELD

The present application relates generally to the field of wireless communication systems, and more specifically to devices, methods, and computer-readable media that improve management of the states of a user equipment's (UE's) secondary serving cells (SCells) during suspension and resumption of the UE's connection with a cellular network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN and earlier-generation RANs (e.g., UTRAN/"3G" and/or GERAN/"2G") as well as later-generation RANs in some cases. As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1.

In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. There are two RRC states defined for an LTE UE. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

In LTE Rel-13, a mechanism was introduced for the UE to be suspended by the network in a suspended state similar to RRC_IDLE but with some important differences. First, the suspended state is not a third RRC "state" alongside RRC_IDLE and RRC_CONNECTED; rather it can be viewed as a "substrate" of RRC_IDLE. Second, both the UE and the serving eNB store the UE's AS (e.g., S1-AP) context and RRC context after suspension. Later when the suspended UE needs to resume a connection (e.g., to send UL data), instead of going through the conventional service request procedure, the suspended UE merely sends an RRC-ConnectionResumeRequest message to the eNB. The preserved AS and RRC contexts are resumed from where they were suspended earlier. Suspend/resume operation can reduce UE latency (e.g., for accessing Internet) and UE signaling with the network. These improvements can reduce UE energy consumption, particularly for machine type communication (MTC) devices that send very little data (i.e., signaling being a primary consumer of energy).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

A feature added in LTE Rel-10 (Rel-10) is support for bandwidths larger than 20 MHz, while remaining backward compatible with Rel-8. As such, a wideband LTE Rel-10 carrier (e.g., wider than 20 MHz) should appear as a number of carriers (referred to as "component carriers" or "CCs") to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by means of Carrier Aggregation (CA), whereby an LTE Rel-10 terminal can receive multiple CCs, each preferably having the same structure as a Rel-8 carrier.

An example of CA is illustrated in FIG. 3. In this example, base station 300 (e.g., an eNodeB or eNB, for short) provides service or coverage to user equipment (UE, e.g., wireless device), such as UE 302, using three different cells, labelled PCell1, SCell2, and SCell3 in the diagram. The coverage in these cells are provided by three different carriers (or "component carriers") CC1, CC2, and CC3, respectively. As such, the terms "carrier," "component carrier," (or CC, for short) and "cell" are often used interchangeably in the context of CA. Moreover, a cell which a UE is configured to use is referred to as a "serving cell" for that UE, regardless if it is the UE's PCell or SCell. It should be noted that the configuration shown in FIG. 3 is an illustrative example, and CA configurations using any number of carriers and cells may be employed.

In the context of LTE, a primary serving cell (PCell, e.g., PCell1) is defined as the "main" cell serving the wireless device such that both data and control signaling can be transmitted over the PCell, while one or more supplementary or secondary serving cells (SCells, e.g., SCell2 and SCell3) are typically used for transmitting data only. For example, the SCell(s) provide(s) extra bandwidth to enable greater data throughput. A CA-capable UE is assigned a PCell (e.g., PCell1) that is always activated, and one or more SCells (e.g., SCell2 and/or SCell3) which can be activated or deactivated dynamically.

The number of aggregated CCs as well as the bandwidth of individual CCs can be different for UL and DL. A "symmetric configuration" refers to the case where the number of CCs in UL and DL is the same, whereas an "asymmetric configuration" refers to the case that the number of CCs is different. Furthermore, the number of CCs configured in a cell may be different from the number of CCs seen by a UE. For example, a UE can support more DL CCs than UL CCs, even though the cell is configured with the same number of UL CCs and DL CCs.

A dual connectivity framework was introduced in LTE Rel-12. Dual connectivity (or DC) refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells associated with either the MeNB or the SeNB(s) and includes one MAC entity, a set of logical channels with associated RLC entities, a primary cell, and optionally one or more secondary cells. The Master Cell Group (MCG) is a group of serving cells associated with the MeNB and includes a primary cell (PCell) and optionally one or more secondary cells (SCells). A Secondary Cell Group (SCG) is a group of serving cells associated with the SeNB and includes a Primary SCell (PSCell) and optionally one or more SCells. The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MN. However, the MeNB can also configure the UE based on input from the SeNB and hence the SeNB can also indirectly control the UE. In an LTE-DC configuration, the MeNB is connected to the SeNBs via the Xn interface, which is currently selected to be the same as the X2 interface between the two eNBs.

In 3GPP, a study item on a new radio interface for 5G has been completed and 3GPP is standardizing this new radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

In NR Rel-15, a new RRC_INACTIVE state has been defined and procedures sharing some similarities with suspend/resume from LTE Rel-13 have been defined. The UE goes into RRC_INACTIVE state upon receiving an RRCRelease message with suspend configuration. The UE sends a RRCResumeRequest message to the network (e.g., when it gets a new UL data or it is paged due to new DL data) and in response may receive an RRCResume from the network, which will make it switch to RRC_CONNECTED state again.

Although the Rel-15 RRC_INACTIVE state provides various benefits with respect to NR UE power consumption, the current specification of this RRC_INACTIVE state has various issues, drawbacks, and/or challenges associated with the activation or deactivation of SCells when the UE resumes RRC_CONNECTED operation after existing RRC_INACTIVE state.

SUMMARY

Exemplary embodiments disclosed herein address these and other problems, issues, and/or drawbacks of existing solutions by providing flexible and efficient techniques to control the state of each SCell for a UE during mobility procedures (e.g., resume). Such techniques can avoid ambiguity due to undefined SCell state during such mobility procedures, reduce the amount of signaling required between network and UE, and facilitate faster setup of CA resources for a UE. Such improvements are merely exemplary, however, and skilled persons may recognize other advantages and/or benefits provided by various embodiments in view of the present disclosure.

Exemplary embodiments include methods (e.g., procedures) for managing a UE's secondary serving cells (SCells) in a wireless network. These exemplary method can be performed by a user equipment (UE, e.g., wireless device, MTC device, NB-IoT device, modem, etc. or component thereof) in communication with a network node (e.g., base station, eNB, gNB, etc., or components thereof) via a PCell and one or more SCells.

These exemplary methods can include receiving, from a first network node in the wireless network, a message to suspend a connection with the first network node. The configured cells can include a primary serving cell (PCell) and one or more SCells, and the SCells can have respective first SCell states, such as activated, deactivated, and dormant.

In some embodiments, these exemplary methods can also include storing the first SCell states in response to the suspend message. In some embodiments, these exemplary methods can also include sending the first SCell states to the first network node in response to the suspend message.

These exemplary methods can also include suspending the connection in response to the suspend message. These exemplary methods can also include receiving a message to resume the connection. The resume message can include an indication of second SCell states for the one or more SCells, and/or for one or more further SCells to be added to the configured cells upon resuming the connection. The resume message can be received from the first network node or a second network node in the wireless network. In some embodiments, each of the indicated second SCell states can be one of the following: activated, deactivated, and dormant.

In some embodiments, the resume message can include a configuration for the one or more SCells and/or the one or more further SCells to be added. In such embodiments, the indication of the second SCell states can be part of the configuration.

In some embodiments, the indication can indicate that, upon resuming the connection, the UE should use the stored first SCell states as the second SCell states for the one or more SCells. In some embodiments, the absence of the indication can indicate that, upon resuming the connection, the UE should use a default state as the second SCell states for the one or more SCells.

In some embodiments, upon resuming the connection, the UE can use the stored first SCell states as the second SCell states for the one or more SCells. In some embodiments, the indication itself can indicate that the UE should use the stored SCell states in this manner. In other embodiments, the absence of an indication of states for the one or more SCells (e.g., in the message received) can indicate that the UE should use the stored SCell states in this manner. In yet other embodiments, the absence of such an indication can indicate that, upon resuming the connection, the UE should use a default state as the second SCell states for the one or more SCells.

In some embodiments, the indication can indicate that, upon resuming the connection, the UE should determine the second SCell states for the one or more SCells based on signal quality measurements. In such embodiments, these exemplary methods can also include perform the signal quality measurements on each of the one or more SCells, and placing the one or more SCells in respective states based on the signal quality measurements and one or more thresholds. For example, the UE can place a particular SCell in a first state if the signal quality measurements are below a first threshold, a second state if the signal quality measurements are above the first threshold but below a second threshold, and a third state if the signal quality measurements are above the second threshold.

In some embodiments, these exemplary methods can also include determining, upon resuming the connection, if the UE is in the same area as when the suspend message was received and, based on determining that the UE is in the same area, placing the one or more SCells in the second SCell states according to the indication. Such embodiments can also include, based on determining that the UE is not in the same area, performing one or more of the following operations: deleting the stored first SCell states and placing the one or more SCells in a deactivated state; deleting a stored configuration for the one or more SCells; and removing the one or more SCells from the connection.

In some embodiments, these exemplary methods can also include starting respective timers for the one or more SCells in response to the resume message. The respective timers can be selected, by the UE, from a plurality of timers based on the respective second SCell states.

Other embodiments include methods (e.g., procedures) for managing secondary serving cells (SCells) of a user equipment (UE). These exemplary methods can be performed by one or more network nodes (e.g., base stations, eNBs, gNBs, etc., or component thereof) in the wireless network (e.g., E-UTRAN, NG-RAN).

These exemplary methods can include sending, to the UE, a message to suspend a connection with the first network node. The connection can be via a plurality of configured cells including a primary serving cell (PCell) and one or more SCells, and the SCells can have respective first SCell states, such as activated, deactivated, and dormant.

In some embodiments, these exemplary methods can also include storing the first SCell states in response to the suspend message. In some embodiments, these exemplary methods can also include receiving the first SCell states from the UE in response to the suspend message.

These exemplary methods can also include sending, to the UE, a message to resume the connection. The resume message can include an indication of second SCell states for the one or more SCells and/or one or more further SCells to be added to the configured cells upon resuming the connection. In some embodiments, each of the indicated second SCell states is one of the following: activated, deactivated, and dormant. In some embodiments, the resume message and the suspend message can be sent by different network nodes in the wireless network.

In some embodiments, the resume message can include a configuration for the one or more SCells and/or the one or more further SCells to be added. In such embodiments, the indication of the second SCell states can be part of the configuration.

In some embodiments, these exemplary methods can also include determining whether to include an indication of second SCell states in the resume message. This determination can be based on the first SCell states (e.g., stored and/or received from the UE) and/or the second SCell states.

In some embodiments, upon resuming the connection, the UE can use stored first SCell states as the second SCell states for the one or more SCells. In some embodiments, the indication itself can indicate that the UE should use stored SCell states in this manner. In other embodiments, the absence of an indication of states for the one or more SCells (e.g., in the message sent) can indicate that the UE should use stored SCell states in this manner.

In some embodiments, the absence of such an indication can indicate that the UE should use a default state (e.g., "deactivated") as the second SCell states for the one or more SCells. In some embodiments, the indication can indicate that, upon resuming the connection, the UE should determine the second SCell states for the one or more SCells based on signal quality measurements.

Other exemplary embodiments include user equipment (UEs, e.g., wireless devices, MTC devices, NB-IoT devices, modems, etc. or components thereof) and network nodes (e.g., base stations, eNBs, gNBs, etc., or components thereof) configured to perform operations corresponding to any of the exemplary methods described herein. Other exemplary embodiments include non-transitory, computer-readable media storing program instructions that, when executed by at least one processor, configure such UEs or network nodes to perform operations corresponding to exemplary methods and/or procedures described herein.

These and other objects, features and advantages of embodiments of the present disclosure will become apparent upon reading the following Detailed Description in view of the Drawings briefly described below.

BRIEF DESCRIPTION OF THE DRAWINGS

FIG. 7 shows an exemplary MAC CE used to activate/deactivate SCells, as specified in 3GPP standards.

FIG. 8 shows an exemplary ASN.1 data structure for a RRCConnection-Reconfiguration message.

FIG. 9 shows an exemplary ASN.1 data structure for a CellGroupConfig information element (IE).

FIGS. 10-12 show exemplary ASN.1 data structures for three exemplary RRCResume messages, according to various exemplary embodiments of the present disclosure.

FIG. 13 shows an exemplary ASN.1 data structure for a CellGroupConfig IE, according to various exemplary embodiments of the present disclosure.

FIG. 14 shows an exemplary ASN.1 data structure for another exemplary RRCResume message, according to various exemplary embodiments of the present disclosure.

FIG. 16 is a flow diagram illustrating an exemplary method (e.g., procedure) performed by a network node (e.g., base station, eNB, gNB, etc., or component thereof), according to various exemplary embodiments of the present disclosure.

FIGS. 22-25 are flow diagrams illustrating various exemplary methods and/or procedures implemented in a communication system, according to various exemplary embodiments of the present disclosure.

DETAILED DESCRIPTION

Figure 1:
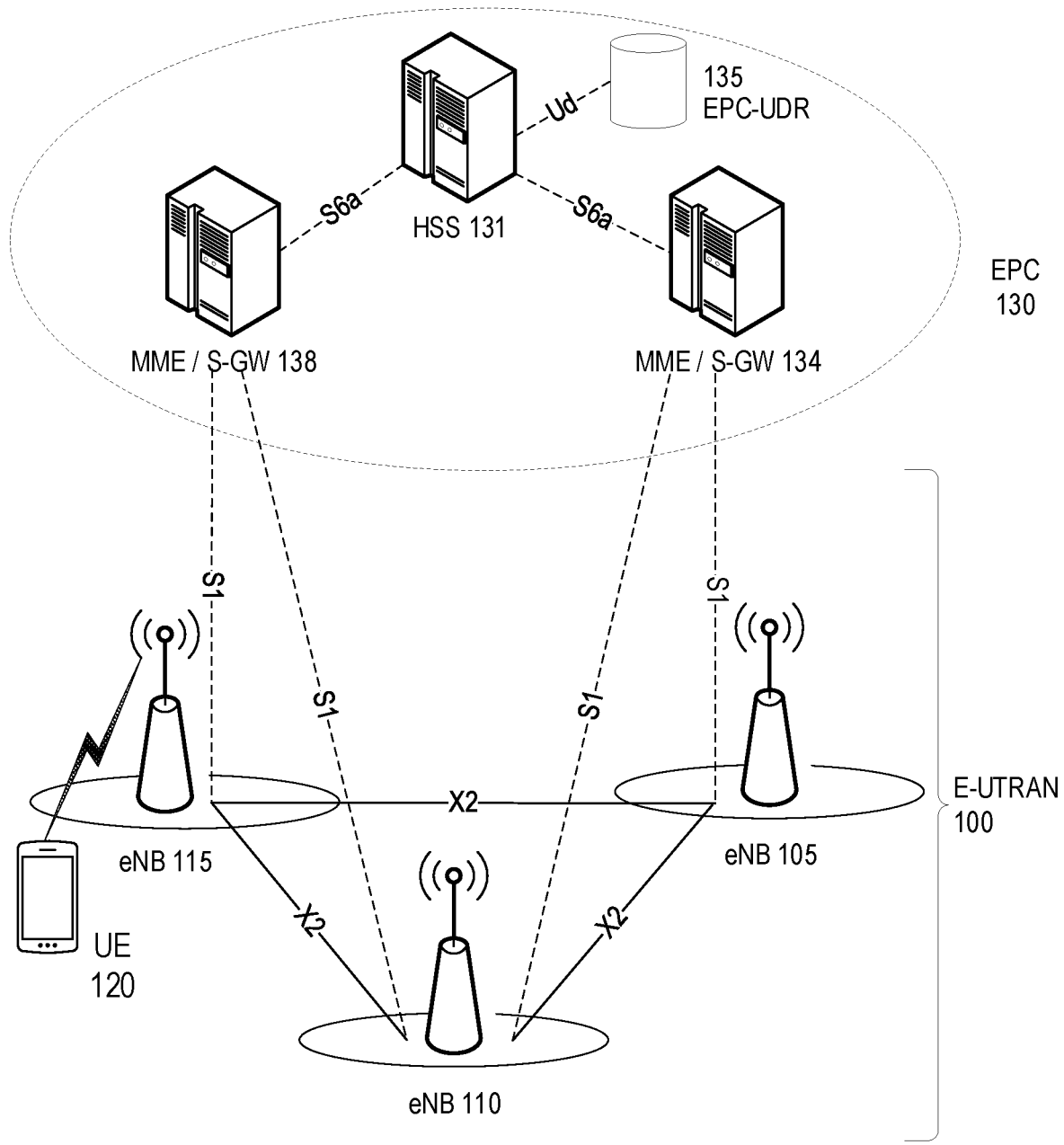
FIG. 1 is a high-level illustration of an exemplary architecture of the Long-Term Evolution (LTE) Evolved UTRAN (E-UTRAN) and Evolved Packet Core (EPC) network, as standardized by 3GPP.
Figure 2A:
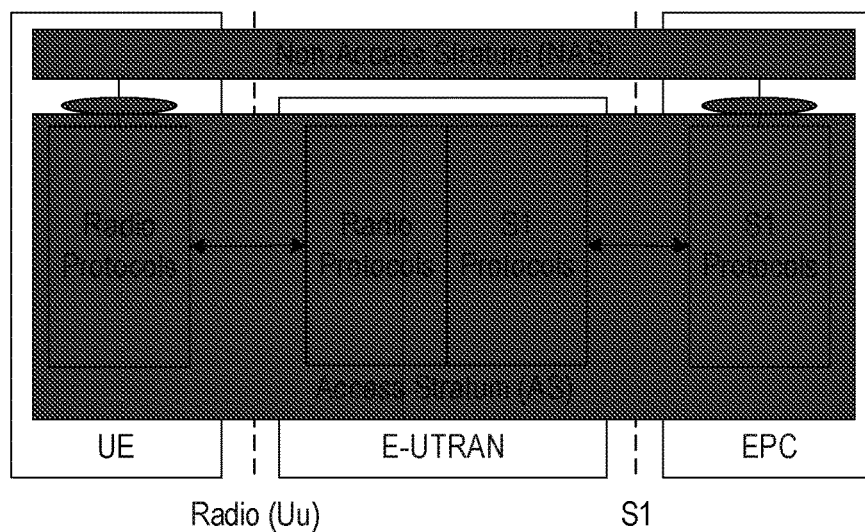
FIG. 2A is a high-level illustration of an exemplary E-UTRAN architecture in terms of its constituent components, protocols, and interfaces.
Figure 2B:
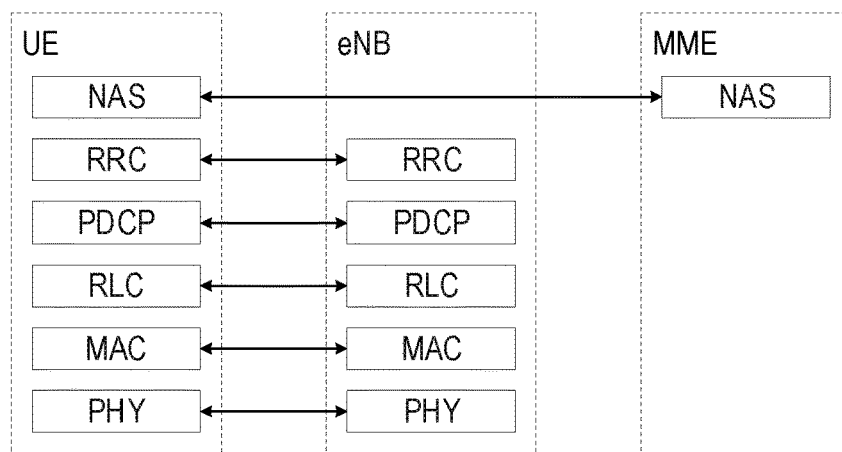
FIG. 2B is a high-level illustration of exemplary protocol layers of the control-plane portion of the radio (Uu) interface between a user equipment (UE) and the E-UTRAN.
Figure 2C:
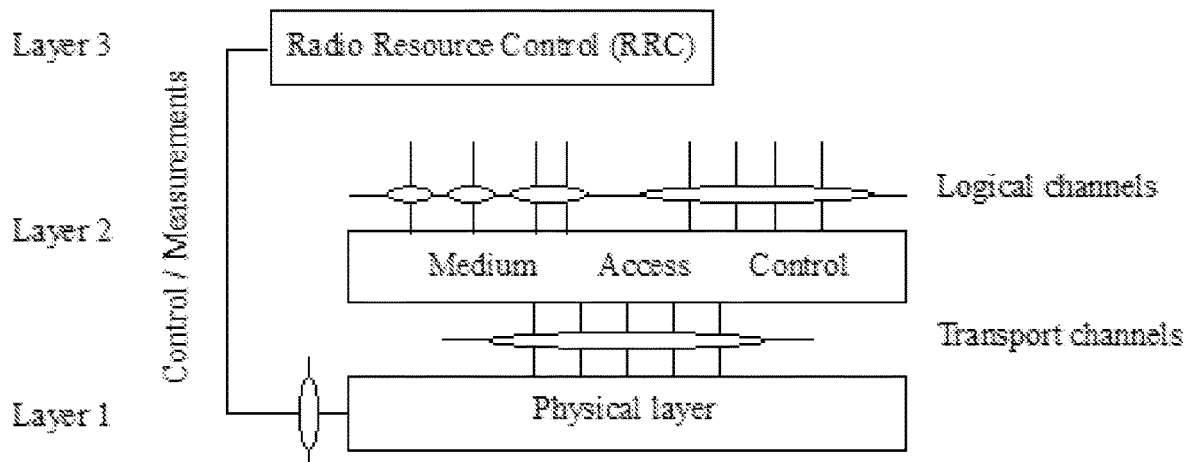
FIG. 2C is a high-level illustration of an exemplary LTE radio interface protocol architecture from the perspective of the PHY layer.
Figure 3:
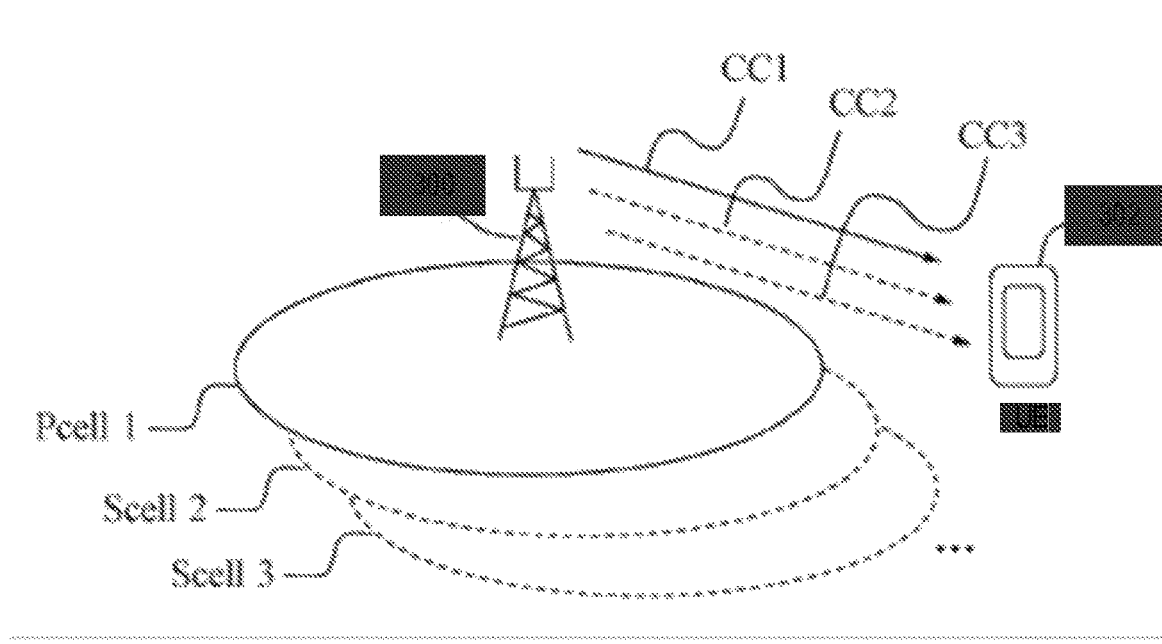
FIG. 3 is a high-level network diagram illustrating an exemplary LTE carrier aggregation (CA) scenario involving various cells provided by base station (e.g., eNB) to a user equipment (UE).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams. In addition, functions and/or operations described herein as being performed by a wireless device or a network node may be distributed over a plurality of wireless devices and/or network nodes.

As mentioned above, although the Rel-15 RRC_INACTIVE state provides various benefits with respect to NR UE power consumption, the current specification of this RRC_INACTIVE state has various issues, drawbacks, and/or challenges associated with the activation or deactivation of SCells when the UE resumes RRC_CONNECTED operation after exiting the RRC_INACTIVE state. These issues are discussed in more detail below.

According to LTE principles, UEs provide measurement reports—whether in response to an event trigger or a periodic trigger—comprising measurements of serving cell(s). For UE in LTE-DC, serving cell means both cells in MCG (MN) and cell in SCG (SN). For mobility measurement, the MeNB configures a UE according to various criteria including, e.g., frequency to measure, how to report, etc. Correspondingly, the UE sends measurement results to MeNB once the measurement criteria are met. According to LTE principles, when the UE needs to send a measurement report, whether event- or periodic-triggered, the UE should always send measurement results of the serving cell to the network. For UE in LTE-DC, serving cell means both cells in MCG (i.e., served by MN) and cell in SCG (i.e., served by SN).

Figure 4:
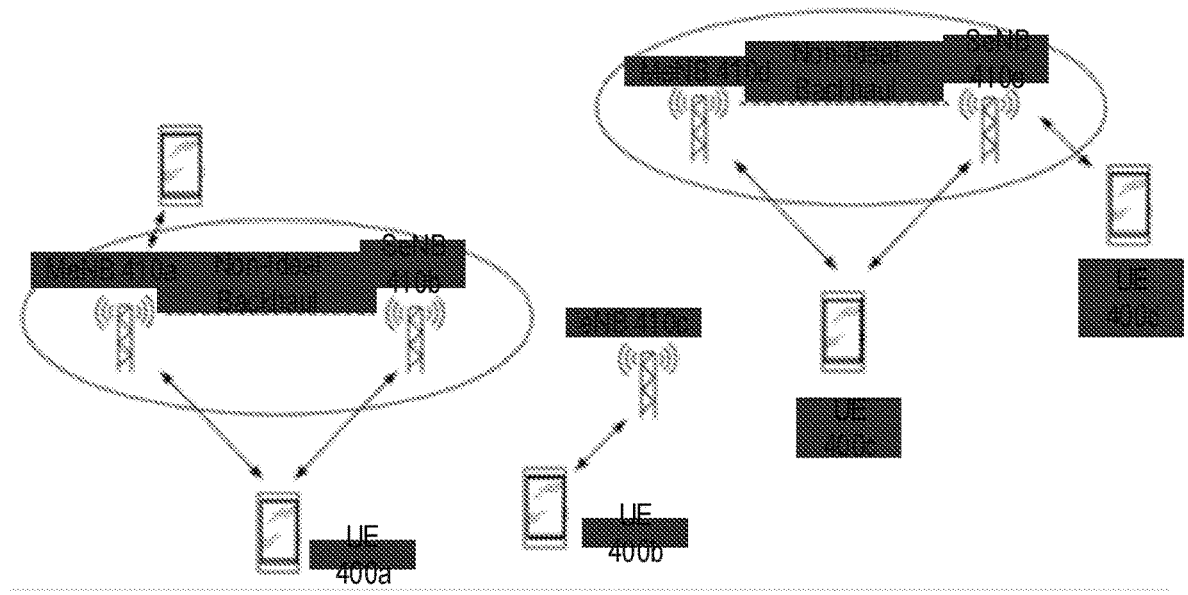
FIG. 4 is a high-level network diagram illustrating various exemplary LTE dual connectivity (DC) scenarios involving user equipment (UEs) and base stations (eNBs).

FIG. 4 illustrates various exemplary LTE DC scenarios involving UEs 400 (e.g., 400a-d) and base stations (eNBs) 410 (e.g., 410a-e). As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. FIG. 4 also illustrates that DC is a UE-specific feature and that a given network node (or a serving cell) can support a dual-connected UE and a legacy UE at the same time. In other words, MeNB and SeNB are roles played, or functions provided, by eNBs 410 in a particular situation, e.g., with respect to a particular UE. Thus, while the eNBs 410 in FIG. 4 are labeled "MeNB" and "SeNB," this indicates only that they are playing this role for at least one UE 400. Indeed, a given eNB 410 may be an MeNB for one UE while being an SeNB for another UE.

In other words, the master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—to receive data from both nodes and thereby increase its data rate. The MeNB (or MN) provides system information, terminates the CP, and can terminate the UP. An SeNB (or SN), on the other hand, terminates only the UP. This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

While LTE was primarily designed for user-to-user communications, 5G (also referred to as "NR") cellular networks are envisioned to support both high single-user data rates (e.g., 1 Gb/s) and large-scale, machine-to-machine (M2M) communication involving short, bursty transmissions from many different devices that share the frequency bandwidth. The 5G radio interface (also referred to as "New Radio" or "NR") targets a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as 10-s or lower and 1 ms end-to-end latency or lower. For eMBB, the requirements on latency and error probability can be less stringent whereas the required supported peak rate and/or spectral efficiency can be higher.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. More specifically, an NR slot can include 7 or 14 symbols for $\Delta f \leq 60$ kHz, and 14 symbols for $\Delta f > 60$ kHz. In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services. Similar to LTE, NR data scheduling is done on a per-slot basis.

Figure 5:
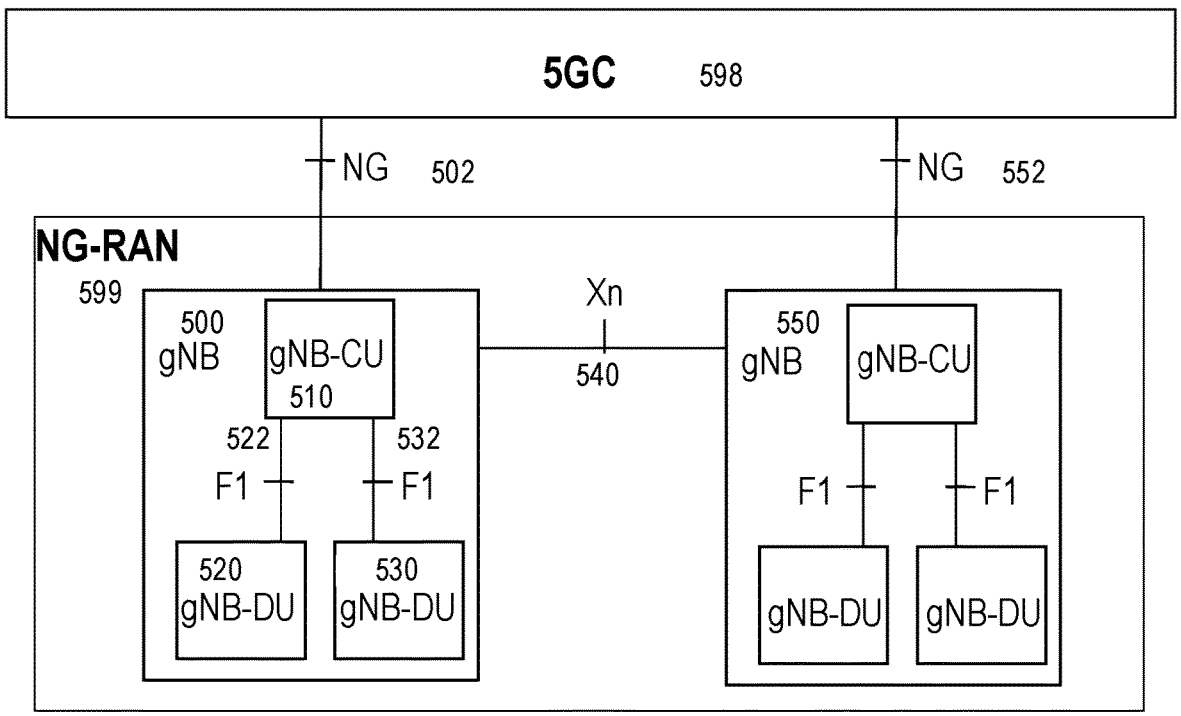
FIGS. 5-6 illustrate two different high-level view of an exemplary 5G network architecture.

FIG. 5 illustrates a high-level view of the 5G network architecture, consisting of a Next Generation RAN (NG-RAN 599) and a 5G Core (5GC 598). NG-RAN 599 can include a set of gNodeB's (gNBs) connected to the 5GC via one or more NG interfaces, whereas the gNBs can be connected to each other via one or more Xn interfaces, such as Xn interface 540 between gNBs 500 and 550 in FIG. 5. With respect the NR interface to UEs, each of the gNBs can support frequency division duplexing (FDD), time division duplexing (TDD), or a combination thereof.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501 V15.4.0.

If security protection for control plane (CP) and user plane (UP) data on TNL of NG-RAN interfaces is supported, NDS/IP (3GPP TS 38.401 V15.4.0) shall be applied.

The NG RAN logical nodes shown in FIG. 5 (and described in TS 38.401 and TR 3GPP TR 38.801 V14.0.0) include a central (or centralized) unit (CU or gNB-CU) and one or more distributed (or decentralized) units (DU or gNB-DU). For example, gNB 500 in FIG. 5 includes gNB-CU 510 and gNB-DUs 520 and 530. CUs (e.g., gNB-CU 510) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 522 and 532 shown in FIG. 5. The gNB-CU and connected gNB-DUs are only visible to other gNBs and the 5GC as a gNB, e.g., the F1 interface is not visible beyond gNB-CU. In the gNB split CU-DU architecture illustrated by FIG. 5, DC can be achieved by allowing a UE to connect to multiple DUs served by the same CU or by allowing a UE to connect to multiple DUs served by different CUs.

Figure 6:
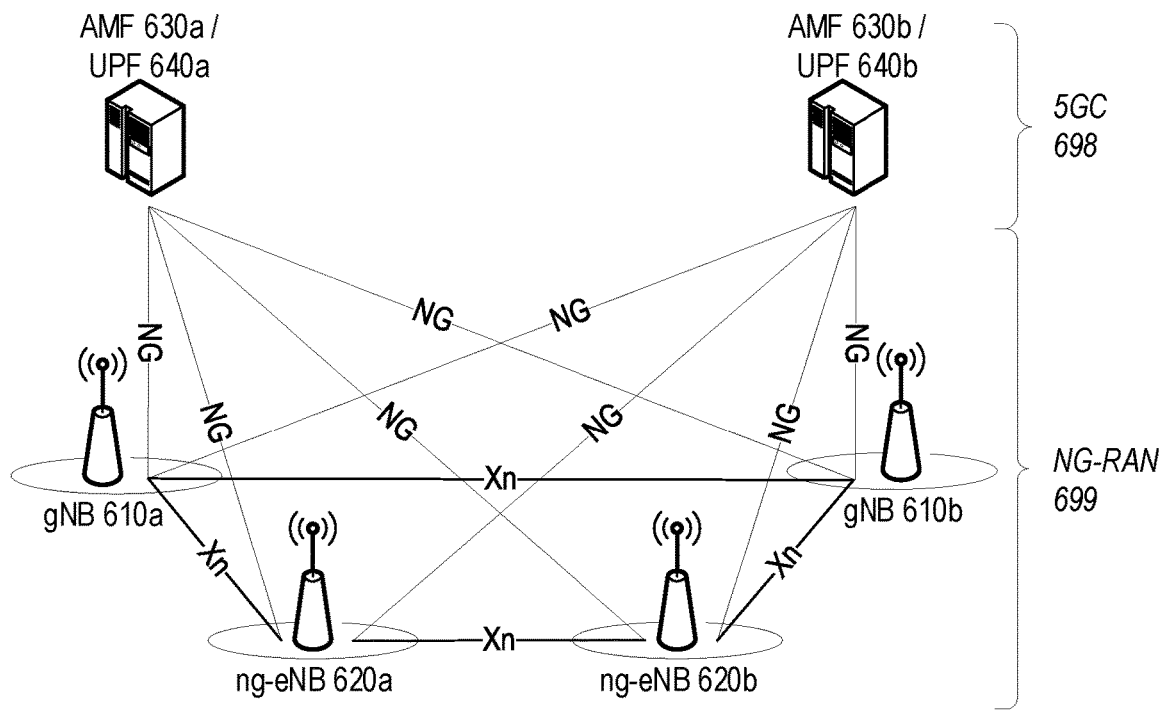

FIG. 6 shows a high-level view of an exemplary 5G network architecture, including a Next Generation Radio Access Network (NG-RAN) 699 and a 5G Core (5GC) 698. As shown in the figure, NG-RAN 699 can include gNBs 610 (e.g., 610a,b) and ng-eNBs 620 (e.g., 620a,b) that are interconnected with each other via respective Xn interfaces. The gNBs and ng-eNBs are also connected via the NG interfaces to 5GC 698, more specifically to the AMF (Access and Mobility Management Function) 630 (e.g., AMFs 630a, b) via respective NG-C interfaces and to the UPF (User Plane Function) 640 (e.g., UPFs 640a,b) via respective NG-U interfaces.

Each of the gNBs 610 can support the NR radio interface, including frequency division duplexing (FDD), time division duplexing (TDD), or a combination thereof. In contrast, each of ng-eNBs 620 supports the LTE radio interface but, unlike conventional LTE eNBs (such as shown in FIG. 1), connect to the 5GC via the NG interface.

Like LTE, NR supports carrier aggregation (CA, allowing a UE to utilize multiple carriers (e.g., CC1, etc.) or serving cells (e.g. PCell, SCells), as they are sometimes referred to. This increases the available bandwidth for the UE and, hence, the potential throughput. Perhaps even more critical in some cases, CA allows the UE to use scattered bandwidths. An operator may have access to several bandwidths, potentially in different frequency bands. With CA, these bandwidths can be aggregated for one UE even though they are separated in frequency.

A UE may be configured with a subset of the cells offered by the network, and the number of aggregated cells (i.e., SCells) configured for one UE can change dynamically through time based on, e.g., terminal traffic demand, type of service used by the terminal, system load, etc. PCells and SCells can be configured (or de-configured) using RRC signaling, which can be slow. Although the UE's PCell is always activated, SCells can be activated (or deactivated) using a Medium Access Control (MAC) control element (CE), which is much faster. FIG. 7 shows an exemplary MAC CE used to activate/deactivate SCells, as specified in 3GPP standards. The exemplary MAC CE is one octet long (although there is a four-octet version as well), and it contains bits $C_i$, i=1 . . . 7, each of which corresponds to a particular SCell. $C_i$ indicates activation status of SCell i, with a value of "1" indicating that SCell i should be activated and a value of "0" indicating that it should be deactivated.

Since the activation/deactivation process is based on the faster MAC CE signaling, the number of activated SCells can be quickly adjusted to match the data rate the UE needs at any given time. In other words, the above-described SCell activation scheme provides the ability to keep multiple SCells configured but only activate them individually as needed.

As briefly mentioned above, in NR Rel-15, a new RRC_INACTIVE state has been defined and procedures sharing some similarities with suspend/resume from LTE Rel-13 have been specific. The UE goes into RRC_INACTIVE state upon receiving an RRCRelease message with suspend configuration. The UE sends a RRCResumeRequest message to the network (e.g., when it gets a new UL data or it is paged due to new DL data) and in response may receive an RRCResume from the network, which will cause the UE to return to RRC_CONNECTED state.

In addition to the activated and deactivated SCell states discussed above, another state, known as "dormant" state, has been introduced for SCells in LTE rel-15 and is being discussed for NR in rel-16. The dormant state may be considered to be in the middle of activated state and deactivated state. For this new state, the UE shall report CQI for cells in this state, but the UE does not monitor downlink data/control channels (PDSCH/PDCCH) for cells in this state. This limited downlink monitoring can reduce UE power consumption compared to cells in the activated state. However, the UE will not be able to receive and/or transmit data on "dormant" cells without activating such cells. Such transitions can be faster than moving a cell from deactivated state to activated state, hence the latency and/or delay experienced by user data can be shorter starting in the dormant state rather than in the deactivated state.

Similar to state transitions between active and deactivated state, MAC CEs are used for the network to indicate to the UE to move cells to/from dormant state. Moving a cell to dormant is also referred to in 3GPP specifications "hibernating." In current LTE specifications (since Rel-15), the network can configure an RRC_CONNECTED UE to add SCell(s) using a RRCConnectionReconfiguration message, which can be defined by the exemplary ASN.1 data structure shown in FIG. 8. At the same time, the network may also indicate the target SCell state, as illustrated in the excerpt below from 3GPP TS 36.331 (v15.3.0):

\*\*\*Begin excerpt from 3GPP TS 36.331 (v15.3.0)\*\*\*
1> if the received RRCConnectionReconfiguration includes the sCellToReleaseList
2> perform SCell release as specified in 5.3.10.3a
1> if the received RRCConnectionReconfiguration includes the sCellToAddModList:
2> perform SCell addition or modification as specified in 5.3.10.3b;
. . .

5.3.10.3b SCell addition/modification
The UE shall:
   1> for each sCellIndex value included either in the sCellToAddModList or in the sCellToAddModList-SCG that is not part of the current UE configuration (SCell addition):
      2> add the SCell, corresponding to the cellIdentification, in accordance with the radioResourceConfigCommonSCell and radioResourceConfigDedicatedSCell, both included either in the sCellToAddModList or in the sCellToAddModList-SCG;
      2> if sCellState is configured for the SCell and indicates activated:
         3> configure lower layers to consider the SCell to be in activated state;
      2> else if sCellState is configured for the SCell and indicates dormant:
         3> configure lower layers to consider the SCell to be in dormant state;
      2> else:
         3> configure lower layers to consider the SCell to be in deactivated state;
. . .

In current LTE specifications, the network can indicate the target SCell state for dual connectivity (DC) in a similar manner, as illustrated in the excerpt below from 3GPP TS 36.331:
   1> for each SCell configured for the UE other than the PSCell:
      2> if sCellState is configured for the SCell and indicates activated:
         3> configure lower layers to consider the SCell to be in activated state;
      2> else if sCellState is configured for the SCell and indicates dormant:
         3> configure lower layers to consider the SCell to be in dormant state;
      2> else:
         3> configure lower layers to consider the SCell to be in deactivated state;
. . .

RRCConnectionReconfiguration
The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration.
   Signalling radio bearer: SRB1
   RLC-SAP: AM
   Logical channel: DCCH
Direction: E-UTRAN to UE
*End excerpt from 3GPP TS 36.331 (v15.3.0)*

As mentioned above, a mechanism was introduced in LTE Rel-13 for the UE to be placed by the network in a suspended state similar to RRC_IDLE but with the difference that the UE stores the Access Stratum (AS) context or RRC context. This makes it possible to reduce the signaling when the UE is becoming active again by resuming the RRC connection, instead of establishing the RRC connection from scratch. In the Rel-13 solution, the UE sends a RRCConnectionResumeRequest message to the network and in response may receive an RRCConnectionResume from the network.

The LTE resume procedure in LTE is specified in 3GPP TS 36.331. As the UE performing resume is in RRC_IDLE (with suspended AS context), that triggers a transition from RRC_IDLE to RRC_CONNECTED. This is specified in a similar manner as RRC connection establishment, which is specified subclause 5.3.3 of 3GPP TS 36.331. Upon suspension, the UE stores its used RRC configuration including any SCell (for CA) or SCG (for DC) configurations. Upon resume, the UE shall release the SCG configurations and SCell configurations, as specified in 3GPP TS 36.331 section 5.3.3.2, repeated below in relevant part.
*Begin excerpt from 3GPP TS 36.331 (v15.3.0)*
5.3.3.2 Initiation
The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.
. . .
Except for NB-IoT, upon initiating the procedure, if connected to EPC or 5GC, the UE shall:
   1> if the UE is resuming an RRC connection from a suspended RRC connection or from RRC_INACTIVE:
   2> if the UE is resuming an RRC connection from a suspended RRC connection:
      3> if the UE was configured with EN-DC:
         4> perform EN-DC release, as specified in TS 38.331 [82], clause 5.3.5.10;
      2> release the MCG SCell(s), if configured, in accordance with 5.3.10.3a;
. . .
      2> release the entire SCG configuration, if configured, except for the DRB configuration (as configured by drb-ToAddModListSCG);
*End excerpt from 3GPP TS 36.331 (v15.3.0)*

If the network wants to setup the UE with CA or DC after resume, then it has to send another RRCConnectionReconfiguration message with SCell and/or SCG configurations.

As mentioned above, in NR rel-15, a new INACTIVE state has been defined and procedures sharing some similarities with suspend/resume from LTE Rel-13 have been defined. The UE goes into INACTIVE state upon receiving an RRCRelease message with suspend configuration. The UE sends a RRCResumeRequest message to the network (e.g. when it gets a new UL data or it is paged due to new DL data) and in response may receive an RRCResume from the network, which will make it switch to CONNECTED mode again.

Different from LTE, however, the NR SCell configurations are stored upon suspension to RRC_INACTIVE and only deleted when released to RRC_IDLE. The specifications define that the UE should store its AS context upon going to RRC_INACTIVE state, with the SCell configurations being part of that AS context. This is specified in section 5.3.8.3 of 3GPP TS 38.331 (v15.4.0), repeated below in relevant part with underline emphasis added to portions believed to be most relevant to the present discussion:
*Begin excerpt from 3GPP TS 38.331 (v15.4.0)*
5.3.8.3 Reception of the RRCRelease by the UE
The UE shall:
. . .
   1> if the RRCRelease includes suspendConfig:
      2> apply the received suspendConfig;
      2> reset MAC and release the default MAC Cell Group configuration, if any;
      2> re-establish RLC entities for SRB1;

2> if the RRCRelease message with suspendConfig was received in response to an RRCResumeRequest or an RRCResumeRequest1:
   . . .
2> else:
   3> store in the UE Inactive AS Context the received suspendConfig, all current parameters configured with RRCReconfiguration or RRCResume, the current $K_{gNB}$ and $K_{RRCint}$ keys, the ROHC state, the C-RNTI used in the source PCell, the cellIdentity and the physical cell identity of the source PCell;
2> suspend all SRB(s) and DRB(s), except SRB0;
   . . .
2> enter RRC_INACTIVE and perform cell selection as specified in TS 38.304 [20];
1> else
   2> perform the actions upon going to RRC_IDLE as specified in 5.3.11, with the release cause 'other'.
*End excerpt from 3GPP TS 38.331 (v15.4.0)*

As shown above, "all current parameters configured with RRCReconfiguration or RRCResume" are stored in the AS context. This includes SCell configurations, since they are configured with these messages. More specifically, SCell configurations for MCG or SCG are provided by the CellGroupConfig information element (IE), which can be defined by the exemplary ASN.1 data structure shown in FIG. 9. Certain fields of the CellGroupConfig 1E shown in FIG. 9 are further defined in Table 1 below.

TABLE 1

| Field name | Description |
| --- | --- |
| mac-CellGroupConfig | MAC parameters applicable for the entire cell group. |
| rlc-BearerToAddModList | Configuration of the MAC Logical Channel, the corresponding RLC entities and association with radio bearers. |
| reportUplinkTxDirect-Current | Enables reporting of uplink Direct Current location information upon BWP configuration and reconfiguration. This field is only present when the BWP configuration is modified or any serving cell is added or removed. This field is not present in the IE CellGroupConfig when provided as part of RRCSetup message. |
| rlmInSyncOutOfSync-Threshold | BLER threshold pair index for IS/OOS indication generation, see TS 38.133 [14], Table 8.1.1-1. n1 corresponds to the value 1. When the field is absent, the UE applies the value 0. Whenever this is reconfigured, UE resets N310 and N311, and stops T310, if running. |
| sCellToAddModList | List of secondary serving cells (SCells) to be added or modified. |
| sCellToReleaseList | List of secondary serving cells (SCells) to be released |
| spCellConfig | Parameters for the SpCell of this cell group (PCell of MCG or PSCell of SCG). |

For NR DC, it has been agreed for Rel-15 to release the SCG configurations upon UE resume. However, Rel-16 is expected to make it possible to resume without releasing the SCG configurations.

When an RRC_INACTIVE UE initiates the resume procedure, the SCell configurations are restored upon the reception of an RRCResume message, which may contain SCell configurations to either add or remove SCells, as shown above. According to the existing need codes defined, if nothing is provided, the previous SCell configuration is maintained due to the MCG configuration IE (e.g., the CellGroupConfig IE for the MCG) being coded as "Need M".

However, when at least one cell is maintained after resume, it is currently ambiguous for the NR UE in which state each stored SCell would start after receiving an RRCResume message. This problem is not relevant in the cases where the network releases all SCells in RRCResume (e.g., by removing all SCells) or adds one or more SCells in RRCResume, since the specifications define that such added SCells should start in the deactivated state. But for the maintained SCells, the unknown state could require the network to send an additional MAC CE in the DL to put each SCell in the desired state after resume, which requires additional signalling. Moreover, if it was desirable for the new SCell(s) added in the RRCResume message to begin in the activated state, an additional MAC CE would be required to put each initially deactivated SCell in the desired state.

Even though the NR UE stores its CA configuration upon transition from RRC_CONNECTED to RRC_INACTIVE state, the actual state of the SCells (i.e. activated, deactivated, dormant) when the UE re-enters RRC_CONNECTED state from RRC_INACTIVE is currently undefined in NR specifications. This makes it impossible for the network to know which state a particular UE would place its SCells. Moreover, the SCell state in that context is not necessarily part of the RRC configuration. Even though an RRCConnectionReconfiguration message could include the target state of SCells, the SCell state(s) can also be changed for with MAC CEs. As such, it is indeed ambiguous what is stored as part of the RRC configuration concerning SCell states. Accordingly, the network must use additional signaling (e.g., MAC CE) to explicitly configure the respective SCell states to known values.

One solution discussed for LTE suspend/resume is that SCells should be maintained by the UE when the RRC connection is suspended and resumed, and that the eNB should indicate which state all SCells should enter. The explicit configuration of SCell states at RRC resume does not, however, allow the eNB to consider the UE's situation for each SCell. As such, the network may activate all of the UE's SCells even though only a few of them are required, which results in excess UE energy consumption. On the other hand, if the network does not activate any SCell upon UE resume, that could result in additional delay since the necessary SCells must be activated in a later message (e.g., MAC CE or RRC).

Exemplary embodiments of the present disclosure address these and other problems and/or shortcomings of prior solutions by a novel technique whereby the network (e.g., a serving node such as a gNB or eNB) can indicate to a UE in a resume message (e.g. RRCResume in NR, RRCConnectionResume in LTE, etc.) the particular state for one or more SCells associated with the UE. For example, the one or more SCells can be added in the resume message, the one or more SCells can maintained from a configuration stored at the UE, or a combination thereof. Upon receiving such indications from the network, the UE can perform resume actions with respect to the one or more SCells in accordance with the indicated states.

In one group of embodiments, the network (e.g., serving gNB or eNB) indicates to the UE whether the UE's SCells should be resumed in the same state as before the UE was suspended and entered RRC_INACTIVE state, or that the UE's SCells should enter a default state (e.g., deactivated)

upon resume. Certain embodiments also provide techniques for handling SCell state-changing timers.

In another group of embodiments, upon being suspended (i.e., entering RRC_INACTIVE state) the UE can store the current state (e.g., activated, deactivated, dormant) for each SCell together with the respective SCell configurations as part of the AS Context. When the stored SCell configurations are restored upon UE resume, the UE also restores the SCell states, and thereby operates according to the SCell states prior to suspension.

Exemplary embodiments can improve network functionality and/or reliability by allowing the network (e.g., gNB or eNB) to control the state of each SCell for a UE during mobility procedures such as RRC resume. Exemplary embodiments can also avoid ambiguity caused by the undefined SCell state upon UE resuming from RRC_INACTIVE state. In addition, exemplary embodiments can avoid the need for MAC CEs for SCell activations and/or SCell state change, which reduces the signaling and speeds up the setup of CA and the usage of network resources. Additional technical advantages may be readily apparent in light of the disclosure herein.

Even so, RRC resume is just one exemplary mobility operation where such embodiments could be applicable and/or beneficial. It can also be possible and/or beneficial to apply similar techniques in other mobility operations and/or scenarios, e.g., in RRC reestablishment.

As briefly mentioned above, in a first group of embodiments, the network indicates to a UE for a certain SCell which state the SCell shall be in when the RRC connection resumes. For example, the network may indicate that an SCell should be in activated state, deactivated state, or dormant state (or any other state further defined for SCell, as long as the UE perform actions towards SCell according to these states). This allows the network to indicate which state each SCell should be in after resume. For example, if the UE has three SCells (SCell1, SCell2 and SCell3) configured, the network may decide to activate SCell1, put SCell2 in dormant state, and deactivate SCell3.

The indication of post-resume SCell states may also refer to SCells being added after resume. In addition, the indication can be used to establish post-resume states for SCells in the MCG and/or SCG.

In another embodiment, the indication from the network can refer to SCells whose configuration is stored at the UE upon suspend to RRC_INACTIVE state, and that should be restored upon the reception of RRCResume. In that case, the RRCResume contents may modify the state of existing SCells at the UE, which can be done sending the modified SCell states together with a reference to, or identifier of, the stored SCell configuration at the UE. In case the UE should resume using same SCell state that it stored, the indication from the network can act as an acknowledgement that the UE shall restore the SCell state and perform actions accordingly.

In some embodiments, the indication can be signaled from the network to the UE in the same message that resumes the RRC connection, such as the RRCResume message. One embodiment of such an RRCResume message is illustrated by the exemplary ASN.1 data structure shown in FIG. 10, which shows the high-level IEs comprising the exemplary RRCResume message. In the embodiment shown in FIG. 10, the RRCResume message includes a new field, sCelIInitialStates, which is a sequence (e.g., list) of size 16, with each entry having a value of "activated", "deactivated", or "dormant". The first entry in the list can correspond to the SCell with index 1, the second entry in the list can correspond to the SCell with index 2, and so on.

Other embodiments of an RRCResume message comprising the indication are also possible. For example, the indication can be included in the masterCellGroup field, which contains the CellGroupConfig IE. Furthermore, some signaling optimizations can also be used to reduce the size of the indication. For example, a list of variable size can be used, which will result in a smaller message when the initial states need to be indicated for only a small number of SCells and/or for only SCells with low indices.

In other embodiments, the indication can be signaled by one or more bitmap fields in the RRCResume message. One embodiment of such a message is illustrated by the exemplary ASN.1 data structure shown in FIG. 11, where three optional bitmaps fields are introduced. If the sCellsToActivate field is included, a value of 1 at position i indicates that the SCell with index i should be activated. If the sCellsToDeactivate field is included, a value of 1 at position i indicates that the SCell with index i should be deactivated. If the sCellsToHibernate field is included, a value of 1 at position i indicates that the cell with index i should be set to dormant state. In all the fields, the value of 0 in a particular position can indicate that the particular action associated with that field does not apply for the SCell index associated with that position.

In other embodiments, the indication can be signaled by two bitmap fields. One embodiment of such a message is illustrated by the exemplary ASN.1 data structure shown in FIG. 12. If the sCellsToActivate field is included, a value of 0 at position i indicates that the SCell with index i should be deactivated, and a value of 1 indicates that SCell should be activated. If the sCellsToHibernate field is included, a value of 1 at position i indicates that the SCell with index i should be set to dormant mode, and a value of 0 means the cell behavior will be defined via the sCellsToActivate field instead.

In another alternative using the same two bitmap fields, the bit at position i in each bitmap can be associated with the SCell having index i. The pair of bits associated with each SCell i can be interpreted as follows:

If sCellsToActivate indicates 0 and sCellsToHibernate indicates 0, then the SCell will be in deactivated state; or If sCellsToActivate indicates 1 and sCellsToHibernate indicates 0, then the SCell will be in activated state; or If sCellsToActivate indicates 1 and sCellsToHibernate indicates 1, then the SCell will be in dormant state.

For example, the combination where sCellsToActivate indicates 0 and sCellsToHibernate indicates 1 can be reserved for future use.

In case the network provides no indication about a particular SCell in the manner described above, the UE can place the SCell in a default state (e.g., deactivated) upon resume. As such, if the network wants all the UE's SCells to be in the default state, the network does not need to send any indications to the UE. Furthermore, even if a particular network node does not send indications because it has not implemented the technique, the UE's SCells would nonetheless end up in the default state.

In another embodiment, the UE resumes with the state of its SCells determined based on measurements made according to a configuration (e.g., a measurement configuration) that the UE had received. For example, one such configuration could be:

If the SCell signal quality (e.g. RSRP) is greater than v1, resume the SCell in activated state;

If the SCell signal quality is between v2 and v1, resume the SCell in dormant state; and If the SCell signal quality is below v2, resume the SCell in deactivated state.

In such embodiments, the UE can indicate to the network in what state the SCells are starting. This can be done, for example, in the RRCResumeRequest/RRCResumeComplete message by including fields similar to the ones indicated in the Resume message above.

In another alternative, the network can configure the target SCell state upon resume as part of the SCell configuration of either MCG or SCG. As such, in some embodiments, the target SCell state can be included in the CellGroupConfig IE associated with MCG and/or SCG. An exemplary ASN.1 data structure according to these embodiments is shown in FIG. 13, with a field sCellState-r16 that indicates the target state when an SCell is added or modified, e.g. upon resume procedure. This field sCellState-r16 can be included in the SCellConfig IE (e.g., as sent in a RRCResume or similar message) when the network wants to add an SCell to the UE's configuration at resume (e.g., in the sCellToAddModList IE shown above). On the other hand, the absence of the sCellState-r16 field associated with an added SCell (e.g., having a matching SCell index) can indicate that the added SCell is deactivated.

This indication sCellState-r16 can also be included in the SCellConfig IE when the network wants to modify the post-resume state of a SCell whose configuration is stored at the UE, e.g., when the UE was suspended to INACTIVE. The modified SCells can be indicated in the sCellToAddModList IE shown above. On the other hand, the absence of the sCellState-r16 field associated with a modified SCell (e.g., having a matching SCell index) can indicate that the modified SCell is deactivated.

In other embodiments, the UE can store its current SCell configuration (e.g., for MCG and SCG) upon the transition from RRC_CONNECTED to RRC_INACTIVE, including the latest state of these SCells (e.g. activated, dormant, deactivated). In the subsequent resume procedure, the UE can determine whether it is the same "area" as before being suspended to RRC_INACTIVE. If it is in the same "area", the UE can perform actions corresponding to any of the embodiments discussed above. If the UE determines that it is not resuming in the same "area", the UE can delete the stored SCell state information and consider all SCells to be deactivated. These UE actions can be initiated upon the reception of RRCResume (or similar) message from the network, by the UE's transmission of RRCResumeRequest (or similar) message.

In one variant, in the resume procedure, the UE may check whether it is the same "area" as before. If it is, the UE perform the actions defined in the method above. If not, i.e., if the UE is not resuming in the same "area", upon resume the UE deletes at least one SCell configuration. That may be done e.g. upon the reception of RRC Resume like message or the transmission of RRC Resume Request like message.

In one variant, in the resume procedure, the UE may check whether it is the same "area" as before. If it is, the UE perform the actions defined in the method above. If not, i.e., if the UE is not resuming in the same "area", upon resume the UE deletes at least one SCell configuration and any state information. That may be done e.g. upon the reception of RRCResume-like message or the transmission of RRCResumeRequest-like message. In various embodiments, an "area" can represent one or more of the following:

a cell, e.g., the cell the UE was suspended:
a list of cells, possibly configured when the UE suspended; and
a RAN notification area (e.g., a list of Tracking Area Code(s), a list of RAN Area Identifiers, etc.), possibly configured when the UE suspended.

In another group of embodiments, the UE can determine the post-resume state of one or more SCells to be the same as the respective states of the one or more SCells at the time it was suspended into RRC_INACTIVE. For example, if SCell1 and SCell2 were activated and SCell3 was deactivated during the UE's most recent RRC_CONNECTED operation before being suspended to RRC_INACTIVE, when the UE is signaled to resume RRC_CONNECTED operation (e.g., by RRC Resume message), the UE can place SCell1 and SCell2 in activated state, and SCell3 in deactivated state. This approach can be based on an assumption that the UE will require the same bandwidth and/or throughput when it resumes the connection with the network, as when the connection was last active.

In some embodiments, this operation can be extended to support also dormant Cells. For example, assume the UE is RRC_CONNECTED and is configured with serving cells PCell, SCell1, SCell2, and SCell3, where SCell1 is activated, SCell2 is dormant, and SCell3 is deactivated. The UE is then suspended into RRC_INACTIVE. When the UE resumes, it will resume with SCell1 activated, SCell2 dormant, and SCell3 deactivated.

In one embodiment, the UE can always resume with the SCell(s) in the same state(s) as before suspension. In another variant, the UE can resume with the SCells in the same state only if it is resuming in the same cell, beam, and/or node as where it was suspended. In other embodiments, the UE can resume with the SCells in the same state only if it is resuming in the same "area", according to the various examples of "area" discussed above.

In other embodiments, the UE can resume with the SCells in the same state only if the network has provided an indication for the UE to do so, with the absence of such indication causing the UE to put the SCells in a default state, which may be deactivated, activated, or dormant. Such a "default" state can be specified (e.g., in 3GPP standards such as 36.331 and/or 38.331), or it could be broadcast by the gNB/eNB in a system information block. In either case, both the network and the UE(s) will be aware of the same default SCell state. In this manner, if the network does not implement this feature or is not aware of the actual state of the UE's SCells prior to suspension to INACTIVE, the network can assume the UE's SCells will be in the default state after resume.

FIG. 14 shows an exemplary ASN.1 data structure according to these embodiments. As shown in FIG. 14, an indication named sCellPreviousState has been added to the RRCResume message. If this indication is present, the UE should start the configured SCells in the same state as they had during the previous connection. On the other hand, if the indication is not present, the UE would place the configured SCells in the default state when establishing the connection. If another SCell is added during the resume procedure that was not configured for the UE before suspension into RRC_INACTIVE, the UE can place that new SCell may enter in a default state, which can be the same as or different than the default post-resume state for the previously configured SCells.

It may be important for the network to know which the actual state of the UE's SCells, e.g., during the UE's most recent connection prior to suspension into RRC_INACTIVE. Currently, the UE SCell state is a MAC state rather than RRC information and, as such, is not stored as part of the UE context. In some embodiments, the state of the SCells may be added to the UE context during the suspend procedure. For example, the specification of the suspend procedure can updated in the manner shown below, with the underline indicating new functionality. Although the following text is based on 3GPP TS 38.331 for NR, a similar approach can be used to update 3GPP TS 36.331 for LTE.
\*\*\*Begin proposed text for 3GPP TS 38.331\*\*\*
5.3.8.3 Reception of the RRCRelease by the UE
The UE shall:

. . .

1> if the RRCRelease includes suspendConfig:

. . .

3> store in the UE Inactive AS Context the received suspendConfig, all current parameters configured with RRCReconfiguration or RRCResume, the current $K_{gNB}$ and $K_{RRCint}$ keys, the ROHC state, the C-RNTI used in the source PCell, the cellIdentity and the physical cell identity of the source PCell and the state of the SCells when the was suspended (i.e. not the initial state when this was added);

2> suspend all SRB(s) and DRB(s), except SRB0 . . . .

\*\*\*End proposed text for 3GPP TS 38.331\*\*\*

In case the UE resumes in a cell served by a different network node (e.g., gNB) than the one serving the cell in which it was suspended (e.g., the gNB that served the UE during its most recent RRC connection), the UE context can provided to the new network node via context fetch procedure. For example, if the UE initially was served by gNB1 and SCell 1 was activated and SCell 2 was deactivated prior to suspension, the gNB1 would capture these states for the SCells in the UE's enhanced context and forward it to gNB2 which serves the cell where the UE resumes. In some embodiments, the network node holding the UE context could modify the UE context each time one of the UE's SCells changes state.

In some embodiments, a specific UE handling of SCell states are defined upon MAC Reset. This handling can include considering all configured SCells to be in the same state (e.g., activated, dormant, or deactivated) after recovering from a MAC Reset.

In some embodiments, the UE can employ various timers when resuming from RRC_INACTIVE state. For example, in the LTE specification there is a timer named sCellDeactivationTimer which ensures that if the UE is not scheduled on an activated SCell for a certain time duration, that SCell is deactivated. Similarly, there is an sCellHibernationTimer for moving an SCell from activated to dormant if the UE is not scheduled for a certain time duration. Likewise, there is a dormantSCellDeactivation Timer that is started when a cell moves to dormant and, upon expiry, moves the cell from dormant to deactivated. This timer ensures that a cell does not stay in dormant state for an extended period of time while not being used.

In some embodiments, if a UE resumes from RRC_INACTIVE to RRC_CONNECTED with an SCell that is starting in activated state, the UE immediately starts the sCellDeactivationTimer or the sCellHibernationTimer for that particular SCell. The choice between these timers can be based on configuration from the gNB. In some embodiments, if a UE resumes from RRC_INACTIVE to RRC_CONNECTED state with an SCell that is starting in dormant state, the UE immediately starts the dormantSCellDeactivationTimer for that particular SCell. In either case, the UE can start the respective timer upon decoding an RRC message (e.g., RRCResume), upon completing the activation/hibernation of the SCells, upon the sending of the RRCResumeComplete message, etc.

The embodiments described above can be further illustrated with reference to FIGS. 15-16, which depict exemplary methods (e.g., procedures) performed by a UE and a wireless network, respectively. In other words, various features of the operations described below, with reference to FIGS. 15-16, correspond to various embodiments described above.

Figure 15:
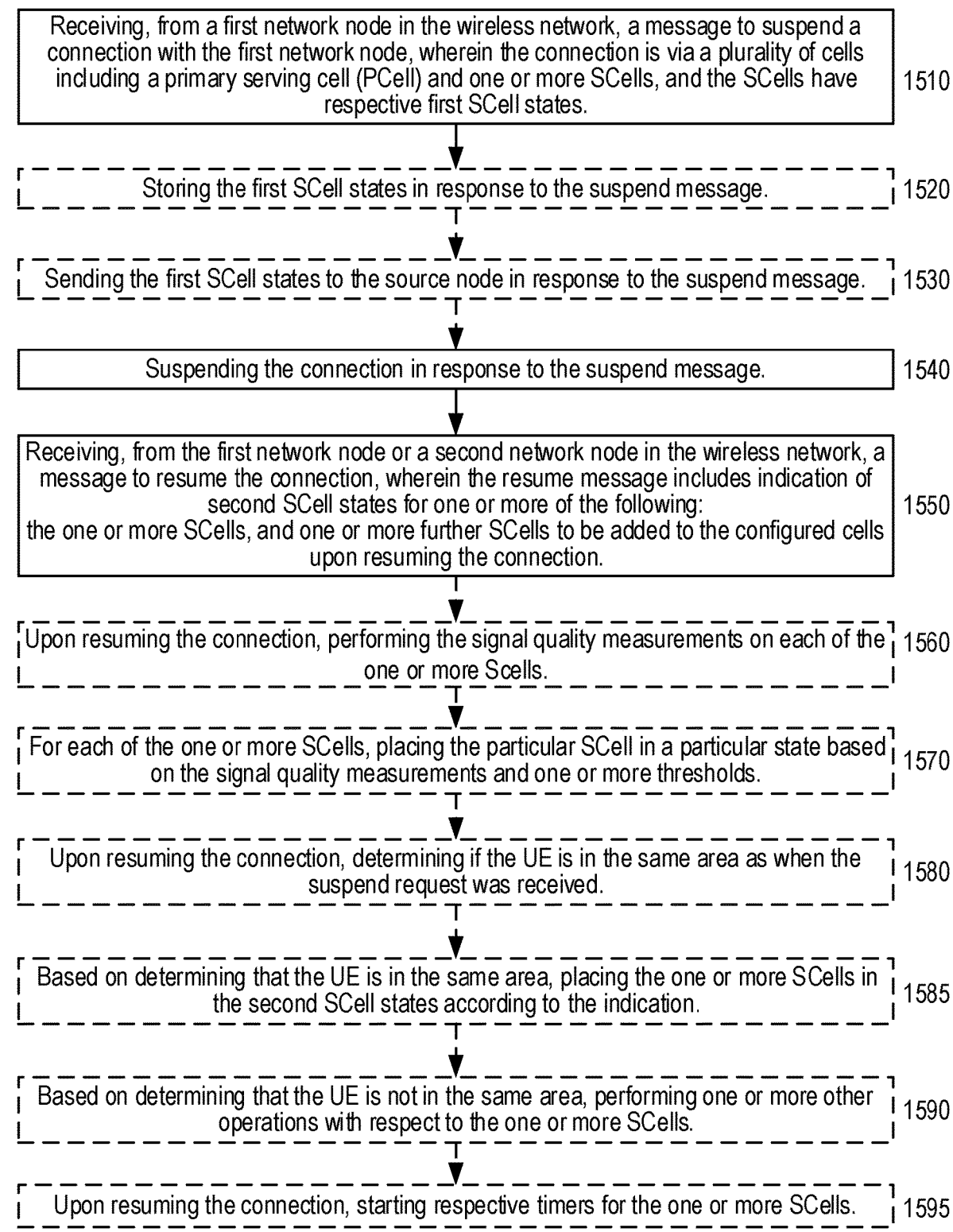
FIG. 15 is a flow diagram illustrating an exemplary method (e.g., procedure) performed by a user equipment (UE, e.g., wireless device, MTC device, NB-IoT device, modem, etc. or component thereof), according to various exemplary embodiments of the present disclosure

In particular, FIG. 15 illustrates an exemplary method (e.g., procedure) for managing a UE's secondary serving cells (SCells) in a wireless network, according to various exemplary embodiments of the present disclosure. The exemplary method can be performed by a user equipment (UE, e.g., wireless device, MTC device, NB-IoT device, modem, etc. or component thereof) in communication with a network node (e.g., base station, eNB, gNB, etc., or components thereof) via a PCell and one or more SCells. For example, the exemplary method shown in FIG. 15 can be implemented in a UE configured according to other figures described herein.

Although the exemplary method is illustrated in FIG. 15 by blocks in a particular order, the operations corresponding to the blocks can be performed in different orders than shown and can be combined and/or divided into blocks having different functionality than shown. Furthermore, the exemplary method shown in FIG. 15 can be complementary to other exemplary methods disclosed herein (e.g., FIG. 16) such that they are capable of being used cooperatively to provide the benefits, advantages, and/or solutions to problems described hereinabove. Optional blocks and/or operations are indicated by dashed lines.

The exemplary method can include the operations of block 1510, where the UE can receive, from a first network node in the wireless network, a message to suspend a connection with the first network node. The configured cells can include a primary serving cell (PCell) and one or more SCells, and the SCells can have respective first SCell states, such as activated, deactivated, and dormant.

In some embodiments, the exemplary method can include the operations of block 1520, where the UE can store the first SCell states in response to the suspend message. In some embodiments, the exemplary method can include the operations of block 1530, where the UE can send the first SCell states to the first network node in response to the suspend message.

The exemplary method can also include the operations of block 1540, where the UE can suspend the connection in response to the suspend message. The exemplary method can also include the operations of block 1550, where the UE can receive a message to resume the connection. The resume message can include an indication of second SCell states for the one or more SCells, and/or for one or more further SCells to be added to the configured cells upon resuming the connection. The resume message can be received from the first network node or a second network node in the wireless network. In some embodiments, each of the indicated second SCell states is one of the following: activated, deactivated, and dormant.

In some embodiments, the resume message can include a configuration for the one or more SCells and/or the one or more further SCells to be added. In such embodiments, the indication of the second SCell states can be part of the configuration.

In some embodiments, upon resuming the connection, the UE can use the stored first SCell states as the second SCell states for the one or more SCells. In some embodiments, the indication itself can indicate that the UE should use the stored SCell states in this manner. In other embodiments, the absence of an indication of states for the one or more SCells (e.g., in the message received in block 1550) can indicate that the UE should use the stored SCell states in this manner. As an example, such a message may include an indication of states for one or more further SCells but no indication of states for the one or more SCells.

In yet other embodiments, the absence of such an indication can indicate that, upon resuming the connection, the UE should use a default state as the second SCell states for the one or more SCells.

In various embodiments, the indication can comprise a first plurality of bitmap fields. In some embodiments, the first plurality can correspond to the number of possible states for an SCell. For example, there can be three bitmap fields, each corresponding to one of activated, deactivated, and dormant states. Each bitmap field can indicate which of the one of more SCells should be placed in the corresponding SCell state upon resuming the connection.

In other embodiments, the first plurality can comprise first and second bitmap fields. In some of these embodiments, each bit of the first bitmap can indicate whether a corresponding one of the SCells should be placed in a first state (e.g., activated) or a second state (e.g., deactivated) upon resuming the connection, and each bit of the second bitmap field can indicate whether a corresponding one of the SCells should be placed in the state indicated by the first bitmap, or in a third state (e.g., dormant). In others of these embodiments, for each of the one or more SCells, a combination of a corresponding bit in the first bitmap field and a corresponding bit in the second bitmap field can indicate the second SCell state for the particular SCell.

In some embodiments, the indication can indicate that, upon resuming the connection, the UE should determine the second SCell states for the one or more SCells based on signal quality measurements. In such embodiments, the exemplary method can also include the operations of blocks 1560-1570. In block 1560, the UE can perform the signal quality measurements on each of the one or more SCells. In block 1570, the UE can, for each of the one or more SCells, place the particular SCell in a state based on the signal quality measurements and one or more thresholds. For example, the UE can place the particular SCell in a first state if the signal quality measurements are below a first threshold, a second state if the signal quality measurements are above the first threshold but below a second threshold, and a third state if the signal quality measurements are above the second threshold.

In some embodiments, the exemplary method can also include the operations of blocks 1580-1590. In block 1580, the UE can determine, upon resuming the connection, if the UE is in the same area as when the suspend message was received. In block 1585, based on determining that the UE is in the same area, the UE can place the one or more SCells in the second SCell states according to the indication. In block 1590, based on determining that the UE is not in the same area, the UE can perform one or more of the following operations: deleting the stored first SCell states and placing the one or more SCells in a deactivated state; deleting a stored configuration for the one or more SCells; and removing the one or more SCells from the connection.

In some embodiments, the exemplary method can also include the operations of block 1595, where the UE can start respective timers for the one or more SCells in response to the resume message. The respective timers can be selected, by the UE, from a plurality of timers based on the respective second SCell states. For example, the UE can select one or more of sCellDeactivationTimer, sCellHibernationTimer, and dormantSCellDeactivationTimer, the properties of which were discussed above.

In addition, FIG. 16 illustrates another exemplary method (e.g., procedure) for managing secondary serving cells (SCells) of a user equipment (UE), according to various exemplary embodiments of the present disclosure. The exemplary method shown in FIG. 16 can be performed by one or more network nodes (e.g., base stations, eNBs, gNBs, etc., or component thereof) in the wireless network (e.g., E-UTRAN, NG-RAN). For example, the exemplary method shown in FIG. 16 can be implemented in a network node configured according to other figures described herein.

Although the exemplary method is illustrated in FIG. 16 by blocks in a particular order, the operations corresponding to the blocks can be performed in different orders than shown and can be combined and/or divided into blocks having different functionality than shown. Furthermore, the exemplary method shown in FIG. 16 can be complementary to other exemplary methods disclosed herein (e.g., FIG. 15) such that they are capable of being used cooperatively to provide the benefits, advantages, and/or solutions to problems described hereinabove. Optional blocks and/or operations are indicated by dashed lines.

The exemplary method can include the operations of block 1610, where the network node can send, to the UE, a message to suspend a connection with the first network node. The connection can be via a plurality of configured cells including a primary serving cell (PCell) and one or more SCells, and the SCells can have respective first SCell states, such as activated, deactivated, and dormant.

In some embodiments, the exemplary method can also include the operations of block 1620, where the network node can store the first SCell states in response to the suspend message. In some embodiments, the exemplary method can also include the operations of block 1630, where the network node can receive the first SCell states from the UE in response to the suspend message.

The exemplary method can also include the operations of block 1650, where the network node can send, to the UE, a message to resume the connection. The resume message can include an indication of second SCell states for the one or more SCells and/or one or more further SCells to be added to the configured cells upon resuming the connection. In some embodiments, each of the indicated second SCell states is one of the following: activated, deactivated, and dormant. In some embodiments, the resume message and the suspend message can be sent by different network nodes in the wireless network (e.g., if the UE has moved to a different cell served by a different network node while suspended).

In some embodiments, the resume message can include a configuration for the one or more SCells and/or the one or more further SCells to be added. In such embodiments, the indication of the second SCell states can be part of the configuration.

In some embodiments, the exemplary method can also include the operations of block 1640, where the network node can determine whether to include an indication of second SCell states in a resume message to the UE (e.g., sent in block 1650). This determination can be based on the first SCell states (e.g., stored and/or received from the UE) and/or the second SCell states. For example, the network node can determine to omit (i.e., not include) an indication of "deactivated" second SCell states for one or more further SCells to be added upon resuming the connection, but to include an indication of other second SCell states for such further SCells. As another example, the network node can determine to omit an indication of "deactivated" second SCell states for one or more SCells whose first SCell states are to be modified, but to include an indication of other second SCell states for such SCells.

In some embodiments, upon resuming the connection, the UE can use stored first SCell states as the second SCell states for the one or more SCells. In some embodiments, the indication itself can indicate that the UE should use stored SCell states in this manner. In other embodiments, the absence of an indication of states for the one or more SCells (e.g., in the message sent in block 1650) can indicate that the UE should use stored SCell states in this manner. As an example, such a message may include an indication of states for one or more further SCells but no indication of states for the one or more SCells.

In other embodiments, the absence of such an indication can indicate that the UE should use a default state (e.g., "deactivated") as the second SCell states for the one or more SCells. In some embodiments, the indication can indicate that, upon resuming the connection, the UE should determine the second SCell states for the one or more SCells based on signal quality measurements.

In various embodiments, the indication can include a first plurality of bitmap fields. In some embodiments, the first plurality can correspond to the number of possible states for an SCell. For example, there can be three bitmap fields, each corresponding to one of activated, deactivated, and dormant states. Each bitmap field can indicate which of the one of more SCells should be placed in the corresponding SCell state upon resuming the connection.

In other embodiments, the first plurality can comprise first and second bitmap fields. In some of these embodiments, each bit of the first bitmap can indicate whether a corresponding one of the SCells should be placed in a first state (e.g., activated) or a second state (e.g., deactivated) upon resuming the connection, and each bit of the second bitmap field can indicate whether a corresponding one of the SCells should be placed in the state indicated by the first bitmap, or in a third state (e.g., dormant). In others of these embodiments, for each of the one or more SCells, a combination of a corresponding bit in the first bitmap field and a corresponding bit in the second bitmap field can indicate the second SCell state for the particular SCell.

Figure 17:
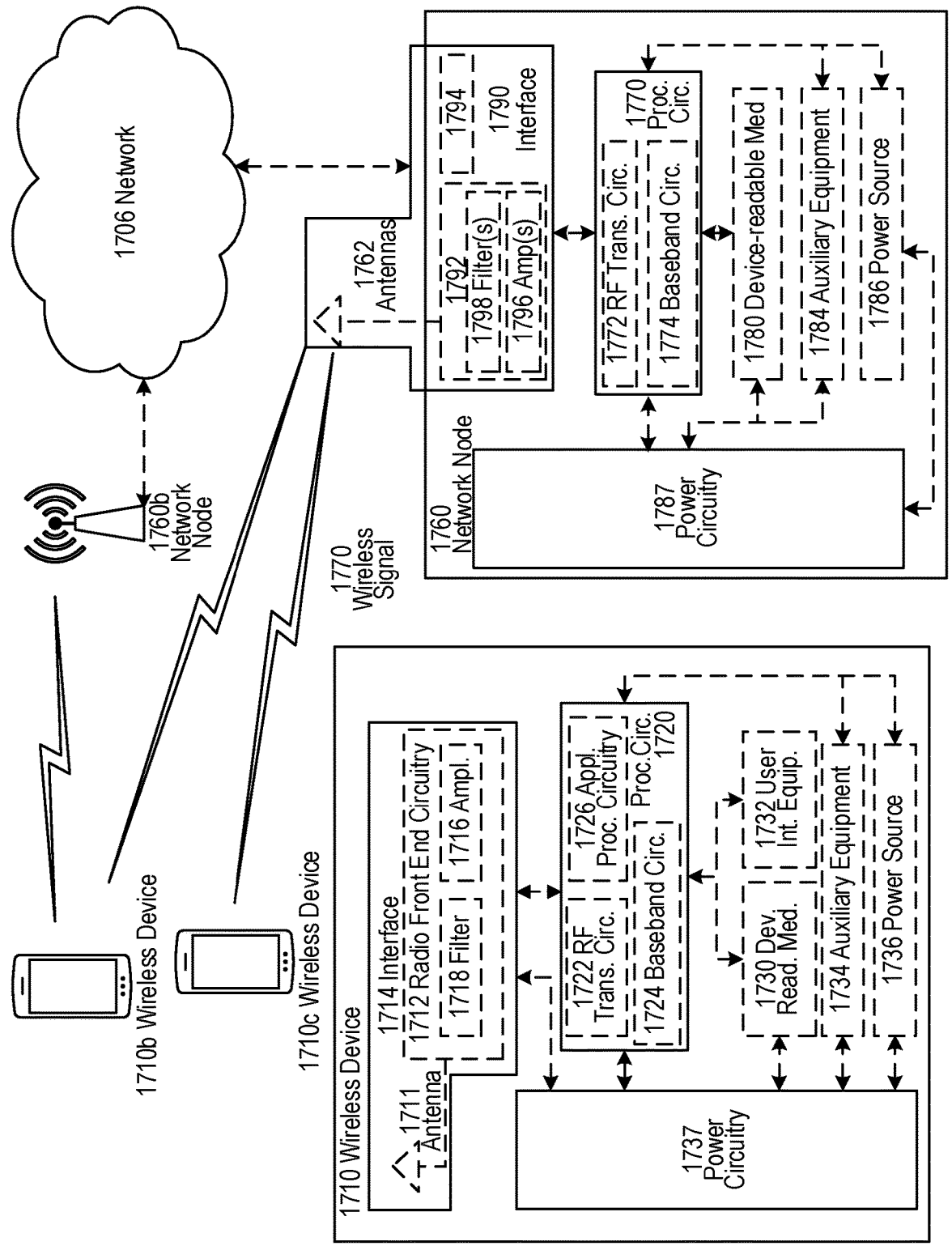
FIG. 17 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760b, and WDs 1710, 1710b, and 1710c. In practice, a wireless network can further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1760 are depicted as single boxes located within a larger box, or nested within multiple boxes, in practice, a network node can comprise multiple different physical components that make up a single illustrated component (e.g., device readable medium 1780 can comprise multiple separate hard drives as well as multiple RAM modules).

Similarly, network node 1760 can be composed of multiple physically separate components (e.g., a NodeB component and an RNC component, or a BTS component and a BSC component, etc.), which can each have their own respective components. In certain scenarios in which network node 1760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1760 can be configured to support multiple radio access technologies (RATs). In such embodiments, some components can be duplicated (e.g., separate device readable medium 1780 for the different RATs) and some components can be reused (e.g., the same antenna 1762 can be shared by the RATs). Network node 1760 can also include multiple sets of the various illustrated components for different wireless technologies integrated into network node 1760, such as, for example, GSM, WCDMA, LTE, NR, WiFi, or Bluetooth wireless technologies. These wireless technologies can be integrated into the same or different chip or set of chips and other components within network node 1760.

Processing circuitry 1770 can be configured to perform any determining, calculating, or similar operations (e.g., certain obtaining operations) described herein as being provided by a network node. These operations performed by processing circuitry 1770 can include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1760, either alone or in conjunction with other network node 1760 components (e.g., device readable medium 1780). Such functionality can include any of the various wireless features, functions, or benefits discussed herein.

For example, processing circuitry 1770 can execute instructions stored in device readable medium 1780 or in memory within processing circuitry 1770. In some embodiments, processing circuitry 1770 can include a system on a chip (SOC). As a more specific example, instructions (also referred to as a computer program product) stored in medium 1780 can include instructions that, when executed by processing circuitry 1770, can configure network node 1760 to perform operations corresponding to various exemplary methods (e.g., procedures) described herein.

In some embodiments, processing circuitry 1770 can include one or more of radio frequency (RF) transceiver circuitry 1772 and baseband processing circuitry 1774. In some embodiments, radio frequency (RF) transceiver circuitry 1772 and baseband processing circuitry 1774 can be on separate chips (or sets of chips), boards, or units, such as radio units and digital units. In alternative embodiments, part or all of RF transceiver circuitry 1772 and baseband processing circuitry 1774 can be on the same chip or set of chips, boards, or units In certain embodiments, some or all of the functionality described herein as being provided by a network node, base station, eNB or other such network device can be performed by processing circuitry 1770 executing instructions stored on device readable medium 1780 or memory within processing circuitry 1770. In alternative embodiments, some or all of the functionality can be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760 but are enjoyed by network node 1760 as a whole, and/or by end users and the wireless network generally.

Device readable medium 1780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1770. Device readable medium 1780 can store any suitable instructions, data or information, including a computer program, software, an application including one or more of logic, rules, code, tables, etc. and/or other instructions capable of being executed by processing circuitry 1770 and, utilized by network node 1760. Device readable medium 1780 can be used to store any calculations made by processing circuitry 1770 and/or any data received via interface 1790. In some embodiments, processing circuitry 1770 and device readable medium 1780 can be considered to be integrated.

Interface 1790 is used in the wired or wireless communication of signaling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that can be coupled to, or in certain embodiments a part of, antenna 1762. Radio front end circuitry 1792 comprises filters 1798 and amplifiers 1796. Radio front end circuitry 1792 can be connected to antenna 1762 and processing circuitry 1770. Radio front end circuitry can be configured to condition signals communicated between antenna 1762 and processing circuitry 1770. Radio front end circuitry 1792 can receive digital data that is to be sent out to other network nodes or WDs via a wireless connection. Radio front end circuitry 1792 can convert the digital data into a radio signal having the appropriate channel and bandwidth parameters using a combination of filters 1798 and/or amplifiers 1796. The radio signal can then be transmitted via antenna 1762. Similarly, when receiving data, antenna 1762 can collect radio signals which are then converted into digital data by radio front end circuitry 1792. The digital data can be passed to processing circuitry 1770. In other embodiments, the interface can comprise different components and/or different combinations of components.

In certain alternative embodiments, network node 1760 may not include separate radio front end circuitry 1792, instead, processing circuitry 1770 can comprise radio front end circuitry and can be connected to antenna 1762 without separate radio front end circuitry 1792. Similarly, in some embodiments, all or some of RF transceiver circuitry 1772 can be considered a part of interface 1790. In still other embodiments, interface 1790 can include one or more ports or terminals 1794, radio front end circuitry 1792, and RF transceiver circuitry 1772, as part of a radio unit (not shown), and interface 1790 can communicate with baseband processing circuitry 1774, which is part of a digital unit (not shown).

Antenna 1762 can include one or more antennas, or antenna arrays, configured to send and/or receive wireless signals. Antenna 1762 can be coupled to radio front end circuitry 1790 and can be any type of antenna capable of transmitting and receiving data and/or signals wirelessly. In some embodiments, antenna 1762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1762 can be separate from network node 1760 and can be connectable to network node 1760 through an interface or port.

Antenna 1762, interface 1790, and/or processing circuitry 1770 can be configured to perform any receiving operations and/or certain obtaining operations described herein as being performed by a network node. Any information, data and/or signals can be received from a wireless device, another network node and/or any other network equipment. Similarly, antenna 1762, interface 1790, and/or processing circuitry 1770 can be configured to perform any transmitting operations described herein as being performed by a network node. Any information, data and/or signals can be transmitted to a wireless device, another network node and/or any other network equipment.

Power circuitry 1787 can comprise, or be coupled to, power management circuitry and can be configured to supply the components of network node 1760 with power for performing the functionality described herein. Power circuitry 1787 can receive power from power source 1786. Power source 1786 and/or power circuitry 1787 can be configured to provide power to the various components of network node 1760 in a form suitable for the respective components (e.g., at a voltage and current level needed for each respective component). Power source 1786 can either be included in, or external to, power circuitry 1787 and/or network node 1760. For example, network node 1760 can be connectable to an external power source (e.g., an electricity outlet) via an input circuitry or interface such as an electrical cable, whereby the external power source supplies power to power circuitry 1787. As a further example, power source 1786 can comprise a source of power in the form of a battery or battery pack which is connected to, or integrated in, power circuitry 1787. The battery can provide backup power should the external power source fail. Other types of power sources, such as photovoltaic devices, can also be used.

Alternative embodiments of network node 1760 can include additional components beyond those shown in FIG. 17 that can be responsible for providing certain aspects of the network node's functionality, including any of the functionality described herein and/or any functionality necessary to support the subject matter described herein. For example, network node 1760 can include user interface equipment to allow and/or facilitate input of information into network node 1760 and to allow and/or facilitate output of information from network node 1760. This can allow and/or facilitate a user to perform diagnostic, maintenance, repair, and other administrative functions for network node 1760.

In some embodiments, a wireless device (WD, e.g., WD 1710) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 can include multiple sets of one or more of the illustrated components for different wireless technologies supported by WD 1710, such as, for example, GSM, WCDMA, LTE, NR, WiFi, WiMAX, or Bluetooth wireless technologies, just to mention a few. These wireless technologies can be integrated into the same or different chips or set of chips as other components within WD 1710.

Antenna 1711 can include one or more antennas or antenna arrays, configured to send and/or receive wireless signals, and is connected to interface 1714. In certain alternative embodiments, antenna 1711 can be separate from WD 1710 and be connectable to WD 1710 through an interface or port. Antenna 1711, interface 1714, and/or processing circuitry 1720 can be configured to perform any receiving or transmitting operations described herein as being performed by a WD. Any information, data and/or signals can be received from a network node and/or another WD. In some embodiments, radio front end circuitry and/or antenna 1711 can be considered an interface.

As illustrated, interface 1714 comprises radio front end circuitry 1712 and antenna 1711. Radio front end circuitry 1712 comprise one or more filters 1718 and amplifiers 1716. Radio front end circuitry 1714 is connected to antenna 1711 and processing circuitry 1720 and can be configured to condition signals communicated between antenna 1711 and processing circuitry 1720. Radio front end circuitry 1712 can be coupled to or a part of antenna 1711. In some embodiments, WD 1710 may not include separate radio front end circuitry 1712; rather, processing circuitry 1720 can comprise radio front end circuitry and can be connected to antenna 1711. Similarly, in some embodiments, some or all of RF transceiver circuitry 1722 can be considered a part of interface 1714. Radio front end circuitry 1712 can receive digital data that is to be sent out to other network nodes or WDs via a wireless connection. Radio front end circuitry 1712 can convert the digital data into a radio signal having the appropriate channel and bandwidth parameters using a combination of filters 1718 and/or amplifiers 1716. The radio signal can then be transmitted via antenna 1711. Similarly, when receiving data, antenna 1711 can collect radio signals which are then converted into digital data by radio front end circuitry 1712. The digital data can be passed to processing circuitry 1720. In other embodiments, the interface can comprise different components and/or different combinations of components.

Processing circuitry 1720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1710 functionality either alone or in combination with other WD 1710 components, such as device readable medium 1730. Such functionality can include any of the various wireless features or benefits discussed herein.

For example, processing circuitry 1720 can execute instructions stored in device readable medium 1730 or in memory within processing circuitry 1720 to provide the functionality disclosed herein. More specifically, instructions (also referred to as a computer program product) stored in medium 1730 can include instructions that, when executed by processor 1720, can configure wireless device 1710 to perform operations corresponding to various exemplary methods (e.g., procedures) described herein.

As illustrated, processing circuitry 1720 includes one or more of RF transceiver circuitry 1722, baseband processing circuitry 1724, and application processing circuitry 1726. In other embodiments, the processing circuitry can comprise different components and/or different combinations of components. In certain embodiments processing circuitry 1720 of WD 1710 can comprise a SOC. In some embodiments, RF transceiver circuitry 1722, baseband processing circuitry 1724, and application processing circuitry 1726 can be on separate chips or sets of chips. In alternative embodiments, part or all of baseband processing circuitry 1724 and application processing circuitry 1726 can be combined into one chip or set of chips, and RF transceiver circuitry 1722 can be on a separate chip or set of chips. In still alternative embodiments, part or all of RF transceiver circuitry 1722 and baseband processing circuitry 1724 can be on the same chip or set of chips, and application processing circuitry 1726 can be on a separate chip or set of chips. In yet other alternative embodiments, part or all of RF transceiver circuitry 1722, baseband processing circuitry 1724, and application processing circuitry 1726 can be combined in the same chip or set of chips. In some embodiments, RF transceiver circuitry 1722 can be a part of interface 1714. RF transceiver circuitry 1722 can condition RF signals for processing circuitry 1720.

In certain embodiments, some or all of the functionality described herein as being performed by a WD can be provided by processing circuitry 1720 executing instructions stored on device readable medium 1730, which in certain embodiments can be a computer-readable storage medium. In alternative embodiments, some or all of the functionality can be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 can be configured to perform any determining, calculating, or similar operations (e.g., certain obtaining operations) described herein as being performed by a WD. These operations, as performed by processing circuitry 1720, can include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 can be operable to store a computer program, software, an application including one or more of logic, rules, code, tables, etc. and/or other instructions capable of being executed by processing circuitry 1720. Device readable medium 1730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1720. In some embodiments, processing circuitry 1720 and device readable medium 1730 can be considered to be integrated.

User interface equipment 1732 can include components that allow and/or facilitate a human user to interact with WD 1710. Such interaction can be of many forms, such as visual, audial, tactile, etc. User interface equipment 1732 can be operable to produce output to the user and to allow and/or facilitate the user to provide input to WD 1710. The type of interaction can vary depending on the type of user interface equipment 1732 installed in WD 1710. For example, if WD 1710 is a smart phone, the interaction can be via a touch screen; if WD 1710 is a smart meter, the interaction can be through a screen that provides usage (e.g., the number of gallons used) or a speaker that provides an audible alert (e.g., if smoke is detected). User interface equipment 1732 can include input interfaces, devices and circuits, and output interfaces, devices and circuits. User interface equipment 1732 can be configured to allow and/or facilitate input of information into WD 1710 and is connected to processing circuitry 1720 to allow and/or facilitate processing circuitry 1720 to process the input information. User interface equipment 1732 can include, for example, a microphone, a proximity or other sensor, keys/buttons, a touch display, one or more cameras, a USB port, or other input circuitry. User interface equipment 1732 is also configured to allow and/or facilitate output of information from WD 1710, and to allow and/or facilitate processing circuitry 1720 to output information from WD 1710. User interface equipment 1732 can include, for example, a speaker, a display, vibrating circuitry, a USB port, a headphone interface, or other output circuitry. Using one or more input and output interfaces, devices, and circuits, of user interface equipment 1732, WD 1710 can communicate with end users and/or the wireless network and allow and/or facilitate them to benefit from the functionality described herein.

Auxiliary equipment 1734 is operable to provide more specific functionality which may not be generally performed by WDs. This can comprise specialized sensors for doing measurements for various purposes, interfaces for additional types of communication such as wired communications etc. The inclusion and type of components of auxiliary equipment 1734 can vary depending on the embodiment and/or scenario.

Power source 1736 can, in some embodiments, be in the form of a battery or battery pack. Other types of power sources, such as an external power source (e.g., an electricity outlet), photovoltaic devices or power cells, can also be used. WD 1710 can further comprise power circuitry 1737 for delivering power from power source 1736 to the various parts of WD 1710 which need power from power source 1736 to carry out any functionality described or indicated herein. Power circuitry 1737 can in certain embodiments comprise power management circuitry. Power circuitry 1737 can additionally or alternatively be operable to receive power from an external power source; in which case WD 1710 can be connectable to the external power source (such as an electricity outlet) via input circuitry or an interface such as an electrical power cable. Power circuitry 1737 can also in certain embodiments be operable to deliver power from an external power source to power source 1736. This can be, for example, for the charging of power source 1736. Power circuitry 1737 can perform any converting or other modification to the power from power source 1736 to make it suitable for supply to the respective components of WD 1710.

Figure 18:
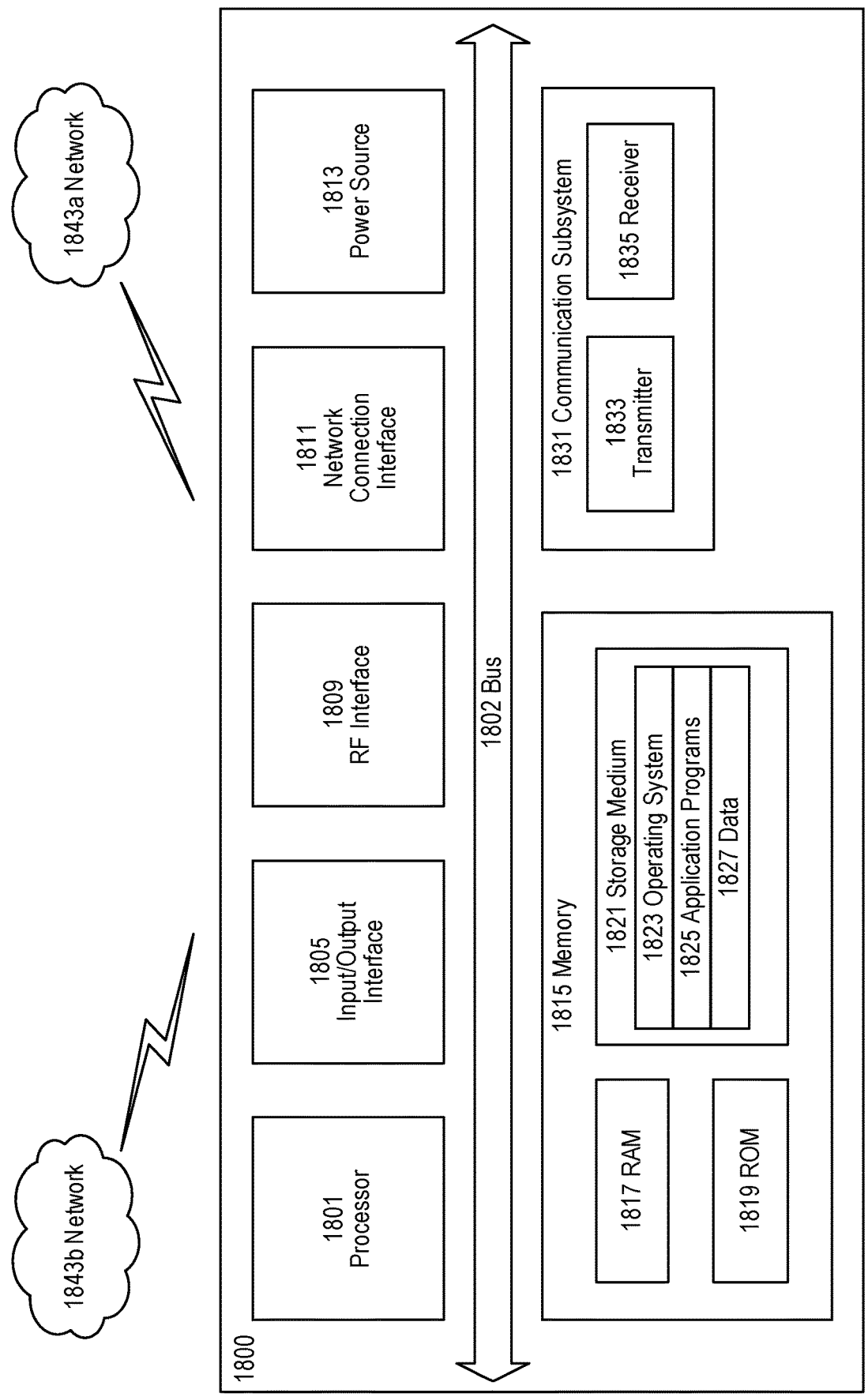
FIG. 18 illustrates an exemplary embodiment of a UE, according to various exemplary embodiments of the present disclosure.

FIG. 18 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 18200 can be any UE identified by the 3 Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the 3 Generation Partnership Project (3GPP), such as 3GPP's GSM, UMTS, LTE, and/or 5G standards. As mentioned previously, the term WD and UE can be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1817, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 can include other similar types of information. Certain UEs can utilize all of the components shown in FIG. 18, or only a subset of the components. The level of integration between the components can vary from one UE to another UE. Further, certain UEs can contain multiple instances of a component, such as multiple processors, memories, transceivers, transmitters, receivers, etc.

In FIG. 18, processing circuitry 1801 can be configured to process computer instructions and data. Processing circuitry 1801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 can include two central processing units (CPUs). Data can be information in a form suitable for use by a computer.

In the depicted embodiment, input/output interface 1805 can be configured to provide a communication interface to an input device, output device, or input and output device. UE 1800 can be configured to use an output device via input/output interface 1805. An output device can use the same type of interface port as an input device. For example, a USB port can be used to provide input to and output from UE 1800. The output device can be a speaker, a sound card, a video card, a display, a monitor, a printer, an actuator, an emitter, a smartcard, another output device, or any combination thereof. UE 1800 can be configured to use an input device via input/output interface 1805 to allow and/or facilitate a user to capture information into UE 1800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 18, RF interface 1809 can be configured to provide a communication interface to RF components such as a transmitter, a receiver, and an antenna. Network connection interface 1811 can be configured to provide a communication interface to network 1843*a*. Network 1843*a* can encompass wired and/or wireless networks such as a local-area network (LAN), a wide-area network (WAN), a computer network, a wireless network, a telecommunications network, another like network or any combination thereof. For example, network 1843*a* can comprise a Wi-Fi network. Network connection interface 1811 can be configured to include a receiver and a transmitter interface used to communicate with one or more other devices over a communication network according to one or more communication protocols, such as Ethernet, TCP/IP, SONET, ATM, or the like. Network connection interface 1811 can implement receiver and transmitter functionality appropriate to the communication network links (e.g., optical, electrical, and the like). The transmitter and receiver functions can share circuit components, software or firmware, or alternatively can be implemented separately.

RAM 1817 can be configured to interface via bus 1802 to processing circuitry 1801 to provide storage or caching of data or computer instructions during the execution of software programs such as the operating system, application programs, and device drivers. ROM 1819 can be configured to provide computer instructions or data to processing circuitry 1801. For example, ROM 1819 can be configured to store invariant low-level system code or data for basic system functions such as basic input and output (I/O), startup, or reception of keystrokes from a keyboard that are stored in a non-volatile memory. Storage medium 1821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1821 can be configured to include operating system 1823; application program 1825 such as a web browser application, a widget or gadget engine or another application; and data file 1827. Storage medium 1821 can store, for use by UE 1800, any of a variety of various operating systems or combinations of operating systems. For example, application program 1825 can include executable program instructions (also referred to as a computer program product) that, when executed by processor 1801, can configure UE 1800 to perform operations corresponding to various exemplary methods (e.g., procedures) described herein.

Storage medium 1821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 can allow and/or facilitate UE 1800 to access computer-executable instructions, application programs or the like, stored on transitory or non-transitory memory media, to off-load data, or to upload data. An article of manufacture, such as one utilizing a communication system can be tangibly embodied in storage medium 1821, which can comprise a device readable medium.

In FIG. 18, processing circuitry 1801 can be configured to communicate with network 1843*b* using communication subsystem 1831. Network 1843*a* and network 1843*b* can be the same network or networks or different network or networks. Communication subsystem 1831 can be configured to include one or more transceivers used to communicate with network 1843*b*. For example, communication subsystem 1831 can be configured to include one or more transceivers used to communicate with one or more remote transceivers of another device capable of wireless communication such as another WD, UE, or base station of a radio access network (RAN) according to one or more communication protocols, such as IEEE 802.18, CDMA, WCDMA, GSM, LTE, UTRAN, WiMax, or the like. Each transceiver can include transmitter 1833 and/or receiver 1835 to implement transmitter or receiver functionality, respectively, appropriate to the RAN links (e.g., frequency allocations and the like). Further, transmitter 1833 and receiver 1835 of each transceiver can share circuit components, software or firmware, or alternatively can be implemented separately.

In the illustrated embodiment, the communication functions of communication subsystem 1831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 can include cellular communication, Wi-Fi communication, Bluetooth communication, and GPS communication. Network 1843*b* can encompass wired and/or wireless networks such as a local-area network (LAN), a wide-area network (WAN), a computer network, a wireless network, a telecommunications network, another like network or any combination thereof. For example, network 1843*b* can be a cellular network, a Wi-Fi network, and/or a near-field network. Power source 1813 can be configured to provide alternating current (AC) or direct current (DC) power to components of UE 1800.

The features, benefits and/or functions described herein can be implemented in one of the components of UE 1800 or partitioned across multiple components of UE 1800. Further, the features, benefits, and/or functions described herein can be implemented in any combination of hardware, software or firmware. In one example, communication subsystem 1831 can be configured to include any of the components described herein. Further, processing circuitry 1801 can be configured to communicate with any of such components over bus 1802. In another example, any of such components can be represented by program instructions stored in memory that when executed by processing circuitry 1801 perform the corresponding functions described herein. In another example, the functionality of any of such components can be partitioned between processing circuitry 1801 and communication subsystem 1831. In another example, the non-computationally intensive functions of any of such components can be implemented in software or firmware and the computationally intensive functions can be implemented in hardware.

Figure 19:
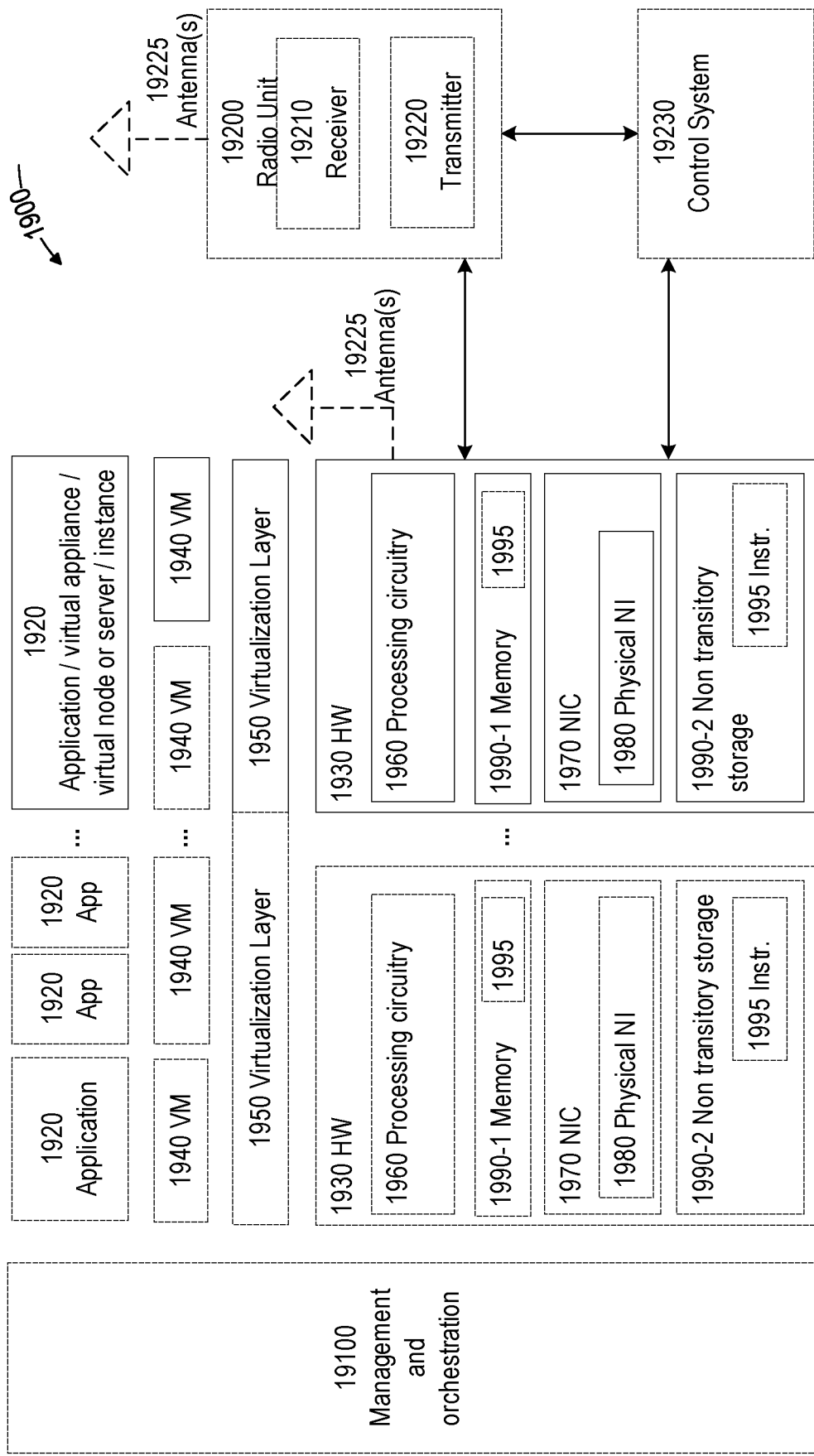
FIG. 19 is a block diagram illustrating an exemplary virtualization environment usable for implementation of various embodiments of network nodes described herein.

FIG. 19 is a schematic block diagram illustrating a virtualization environment 1900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node can be entirely virtualized.

The functions can be implemented by one or more applications 1920 (which can alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900 can include general-purpose or special-purpose network hardware devices (or nodes) 1930 comprising a set of one or more processors or processing circuitry 1960, which can be commercial off-the-shelf (COTS) processors, dedicated Application Specific Integrated Circuits (ASICs), or any other type of processing circuitry including digital or analog hardware components or special purpose processors. Each hardware device can comprise memory 1990-1 which can be non-persistent memory for temporarily storing instructions 1995 or software executed by processing circuitry 1960. For example, instructions 1995 can include program instructions (also referred to as a computer program product) that, when executed by processing circuitry 1960, can configure hardware node 1920 to perform operations corresponding to various exemplary methods (e.g., procedures) described herein. Such operations can also be attributed to virtual node(s) 1920 that is/are hosted by hardware node 1930.

Each hardware device can comprise one or more network interface controllers (NICs) 1970, also known as network interface cards, which include physical network interface 1980. Each hardware device can also include non-transitory, persistent, machine-readable storage media 1990-2 having stored therein software 1995 and/or instructions executable by processing circuitry 1960. Software 1995 can include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and can be run by a corresponding virtualization layer 1950 or hypervisor. Different embodiments of the instance of virtual appliance 1920 can be implemented on one or more of virtual machines 1940, and the implementations can be made in different ways.

During operation, processing circuitry 1960 executes software 1995 to instantiate the hypervisor or virtualization layer 1950, which can sometimes be referred to as a virtual machine monitor (VMM). Virtualization layer 1950 can present a virtual operating platform that appears like networking hardware to virtual machine 1940.

As shown in FIG. 19, hardware 1930 can be a standalone network node with generic or specific components. Hardware 1930 can comprise antenna 19225 and can implement some functions via virtualization. Alternatively, hardware 1930 can be part of a larger cluster of hardware (e.g., such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1940 can be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 can be coupled to one or more antennas 19225. Radio units 19200 can communicate directly with hardware nodes 1930 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 19230, which can alternatively be used for communication between the hardware nodes 1930 and radio units 19200.

Figure 20:
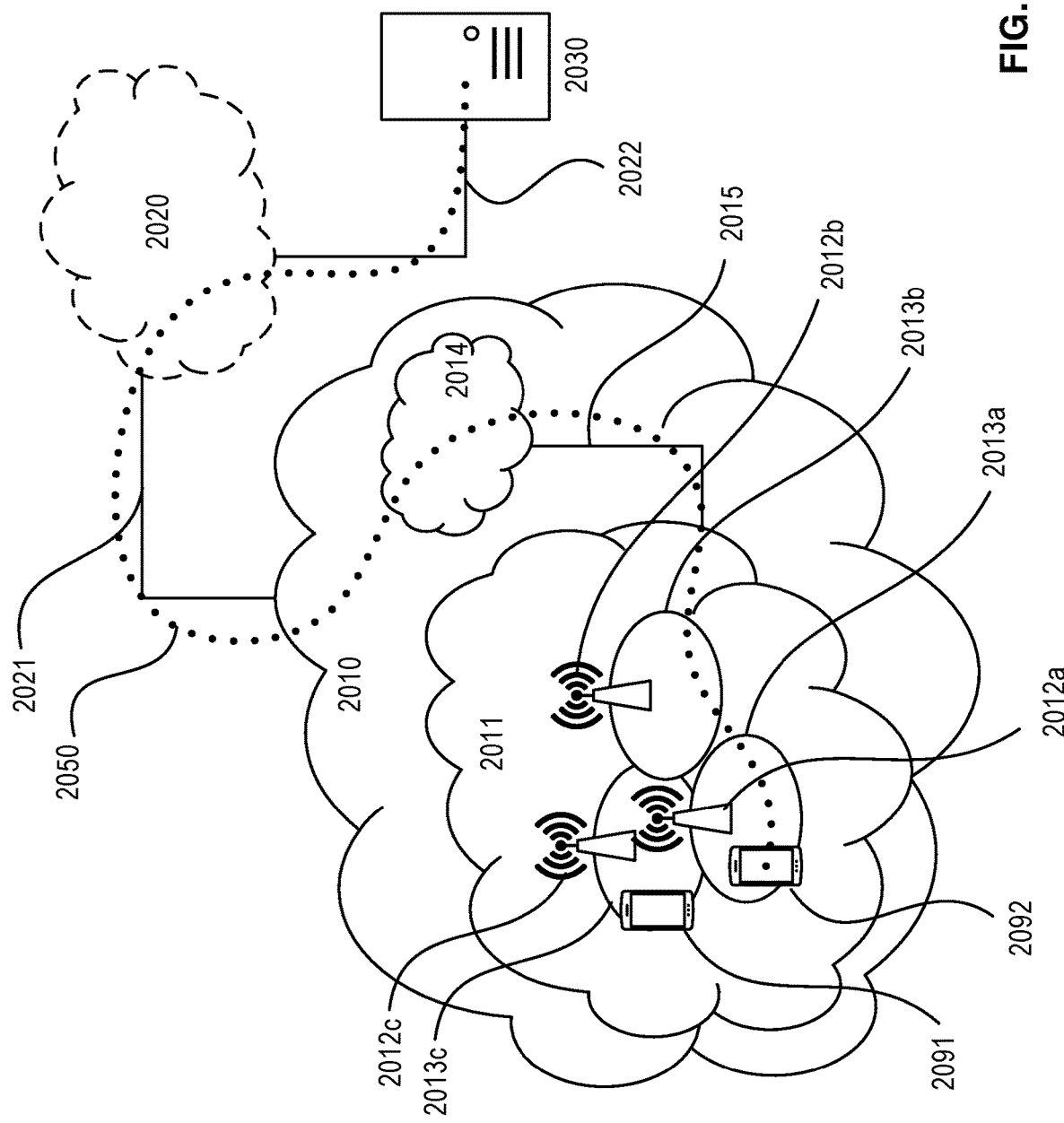
FIGS. 20-21 are block diagrams of various exemplary communication systems and/or networks, according to various exemplary embodiments of the present disclosure.

With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A first UE 2091 located in coverage area 2013c can be configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the Telecommunication network 2010 is itself connected to host computer 2030, which can be embodied in the hardware and/or software of a standalone server, a cloud-implemented server, a distributed server or as processing resources in a server farm. Host computer 2030 can be under the ownership or control of a service provider or can be operated by the service provider or on behalf of the service provider. Connections 2021 and 2022 between telecommunication network 2010 and host computer 2030 can extend directly from core network 2014 to host computer 2030 or can go via an optional intermediate network 2020. Intermediate network 2020 can be one of, or a combination of more than one of, a public, private or hosted network; intermediate network 2020, if any, can be a backbone network or the Internet; in particular, intermediate network 2020 can comprise two or more sub-networks (not shown).

The communication system of FIG. 20 as a whole enables connectivity between the connected UEs 2091, 2092 and host computer 2030. The connectivity can be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 can be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which can have storage and/or processing capabilities. In particular, processing circuitry 2118 can comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 can be operable to provide a service to a remote user, such as UE 2130 connecting via OTT connection 2150 terminating at UE 2130 and host computer 2110. In providing the service to the remote user, host application 2112 can provide user data which is transmitted using OTT connection 2150.

Communication system 2100 can also include base station 2120 provided in a telecommunication system and comprising hardware 2125 enabling it to communicate with host computer 2110 and with UE 2130. Hardware 2125 can include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 can be configured to facilitate connection 2160 to host computer 2110. Connection 2160 can be direct, or it can pass through a core network (not shown in FIG. 21) of the telecommunication system and/or through one or more intermediate networks outside the telecommunication system. In the embodiment shown, hardware 2125 of base station 2120 can also include processing circuitry 2128, which can comprise one or more programmable processors, application-specific integrated circuits, field programmable gate arrays or combinations of these (not shown) adapted to execute instructions.

Base station 2120 also includes software 2121 stored internally or accessible via an external connection. For example, software 2121 can include program instructions (also referred to as a computer program product) that, when executed by processing circuitry 2128, can configure base station 2120 to perform operations corresponding to various exemplary methods (e.g., procedures) described herein.

Communication system 2100 can also include UE 2130 already referred to, whose hardware 2135 can include radio interface 2137 configured to set up and maintain wireless connection 2170 with a base station serving a coverage area in which UE 2130 is currently located. Hardware 2135 of UE 2130 can also include processing circuitry 2138, which can comprise one or more programmable processors, application-specific integrated circuits, field programmable gate arrays or combinations of these (not shown) adapted to execute instructions.

UE 2130 also includes software 2131, which is stored in or accessible by UE 2130 and executable by processing circuitry 2138. Software 2131 includes client application 2132. Client application 2132 can be operable to provide a service to a human or non-human user via UE 2130, with the support of host computer 2110. In host computer 2110, an executing host application 2112 can communicate with the executing client application 2132 via OTT connection 2150 terminating at UE 2130 and host computer 2110. In providing the service to the user, client application 2132 can receive request data from host application 2112 and provide user data in response to the request data. OTT connection 2150 can transfer both the request data and the user data. Client application 2132 can interact with the user to generate the user data that it provides. Software 2131 can also include program instructions (also referred to as a computer program product) that, when executed by processing circuitry 2138, can configure UE 2130 to perform operations corresponding to various exemplary methods (e.g., procedures) described herein.

Figure 21:
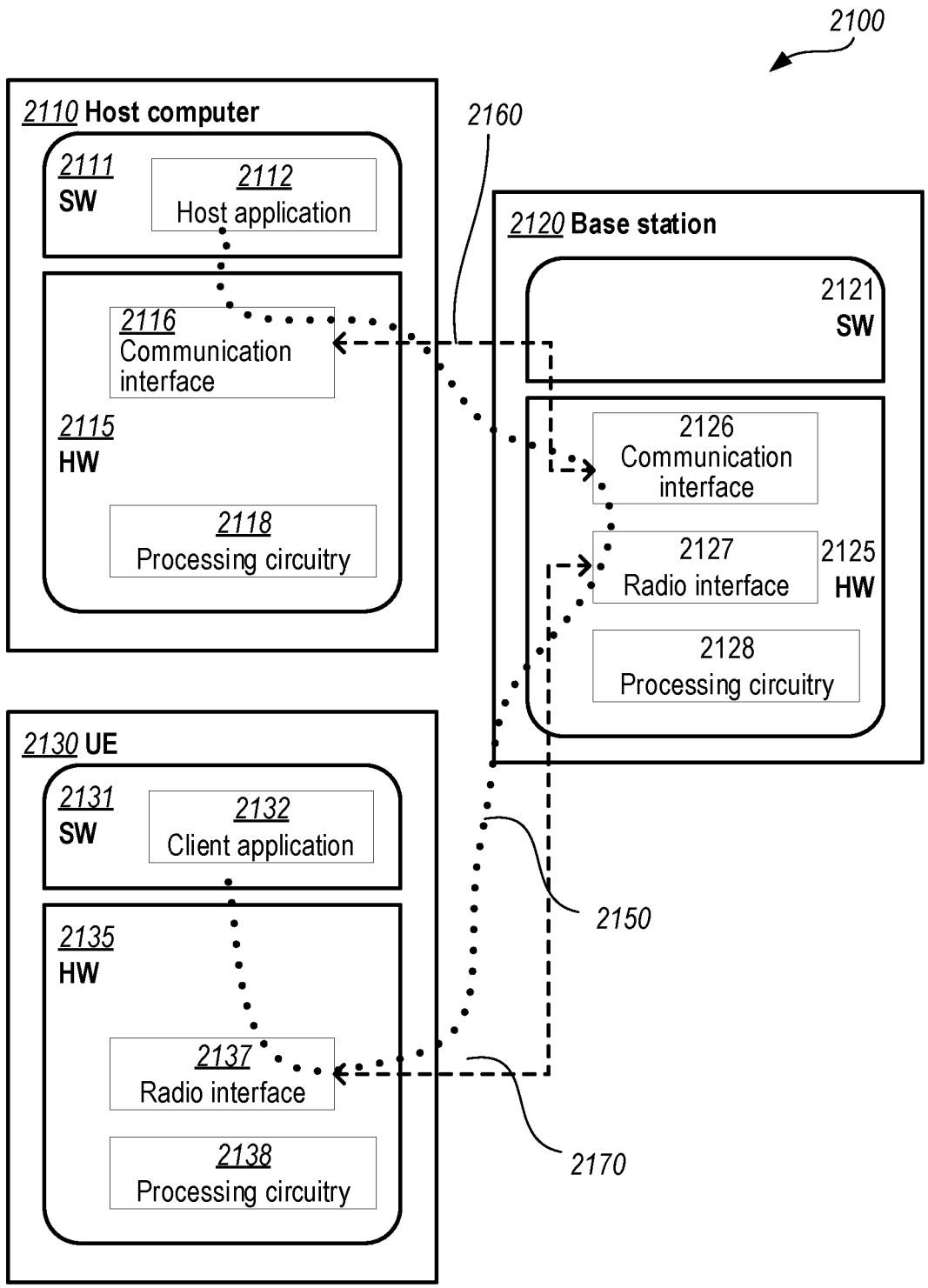

It is noted that host computer 2110, base station 2120 and UE 2130 illustrated in FIG. 21 can be similar or identical to host computer 1230, one of base stations 1612*a*, 1612*b*, 1612*c* and one of UEs 1691, 1692 of FIG. 16, respectively. This is to say, the inner workings of these entities can be as shown in FIG. 21 and independently, the surrounding network topology can be that of FIG. 16.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure can determine the routing, which it can be configured to hide from UE 2130 or from the service provider operating host computer 2110, or both. While OTT connection 2150 is active, the network infrastructure can further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OT connection 2150 between host computer 2110 and UE 2130, in response to variations in the measurement results. The measurement procedure and/or the network functionality for reconfiguring OT connection 2150 can be implemented in software 2111 and hardware 2115 of host computer 2110 or in software 2131 and hardware 2135 of UE 2130, or both. In embodiments, sensors (not shown) can be deployed in or in association with communication devices through which OT connection 2150 passes; the sensors can participate in the measurement procedure by supplying values of the monitored quantities exemplified above, or supplying values of other physical quantities from which software 2111, 2131 can compute or estimate the monitored quantities. The reconfiguring of OT connection 2150 can include message format, retransmission settings, preferred routing etc.; the reconfiguring need not affect base station 2120, and it can be unknown or imperceptible to base station 2120. Such procedures and functionalities can be known and practiced in the art. In certain embodiments, measurements can involve proprietary UE signaling facilitating host computer 2110's measurements of throughput, propagation times, latency and the like. The measurements can be implemented in that software 2111 and 2131 causes messages to be transmitted, in particular empty or 'dummy' messages, using OTT connection 2150 while it monitors propagation times, errors, etc.

FIG. 22 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 22 will be included in this section. In step 2210, the host computer provides user data. In substep 2211 (which can be optional) of step 2210, the host computer provides the user data by executing a host application. In step 2220, the host computer initiates a transmission carrying the user data to the UE. In step 2230 (which can be optional), the base station transmits to the UE the user data which was carried in the transmission that the host computer initiated, in accordance with the teachings of the embodiments described throughout this disclosure. In step 2240 (which can also be optional), the UE executes a client application associated with the host application executed by the host computer.

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission can pass via the base station, in accordance with the teachings of the embodiments described throughout this disclosure. In step 2330 (which can be optional), the UE receives the user data carried in the transmission.

FIG. 24 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 24 will be included in this section. In step 2410 (which can be optional), the UE receives input data provided by the host computer. Additionally or alternatively, in step 2420, the UE provides user data. In substep 2421 (which can be optional) of step 2420, the UE provides the user data by executing a client application. In substep 2411 (which can be optional) of step 2410, the UE executes a client application which provides the user data in reaction to the received input data provided by the host computer. In providing the user data, the executed client application can further consider user input received from the user. Regardless of the specific manner in which the user data was provided, the UE initiates, in substep 2430 (which can be optional), transmission of the user data to the host computer. In step 2440 of the method, the host computer receives the user data transmitted from the UE, in accordance with the teachings of the embodiments described throughout this disclosure.

FIG. 25 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 25 will be included in this section. In step 2510 (which can be optional), in accordance with the teachings of the embodiments described throughout this disclosure, the base station receives user data from the UE. In step 2520 (which can be optional), the base station initiates transmission of the received user data to the host computer. In step 2530 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

1. A method for managing secondary serving cells (SCells) of a user equipment (UE), the method comprising:
   establishing a connection with a network node via a plurality of configured cells, the configured cells including a primary serving cell (PCell) and one or more SCells, wherein the SCells have respective first SCell states;
   receiving, from the network node, a request to suspend the connection;
   in response to the suspend request, storing the first SCell states; and
   receiving, from the network node, a request to resume the connection, the resume request comprising indication of second SCell states for one or more of the following: the one or more SCells, and one or more further SCells to be added to the configured cells upon resuming the connection.

2. The method of embodiment 1, wherein the indication indicates that, upon resuming the connection, the UE should use the stored first SCell states as the second SCell states for the one or more SCells.

3. The method of any of claims 1-2, wherein the absence of the indication indicates that the UE should use a default state as the second SCell states for the one or more SCells.

4. The method of embodiment 1, wherein the indication comprises a first plurality of bitmap fields.

5. The method of embodiment 4, wherein:
   the first plurality corresponds to the number of possible states for an SCell;
   each bitmap field corresponds to one of the possible states for an SCell; and
   each bitmap field indicates which of the one of more SCells should be placed in the corresponding SCell state upon resuming the connection.

6. The method of embodiment 5, wherein the first plurality comprises first and second bitmap fields.

7. The method of embodiment 6, wherein:
   each bit of the first bitmap field indicates whether a corresponding one of the SCells should be placed in a first state or a second state upon resuming the connection; and
   each bit of the second bitmap field indicates whether a corresponding one of the SCells should be placed in the state indicated by the first bitmap, or in a third state.
8. The method of embodiment 6, wherein, for each of the one or more SCells, a combination of a corresponding bit in the first bitmap field and a corresponding bit in the second bitmap field indicates the second state for the particular SCell.
9. The method of embodiment 1, wherein the indication indicates that, upon resuming the connection, the UE should determine the second SCell states for the one or more SCells based on signal quality measurements.
10. The method of embodiment 9, further comprising:
   performing the signal quality measurements on each of the one or more SCells; and
   for each of the one or more SCells, placing the particular SCell in:
      a first state if the signal quality measurements are below a first threshold;
      a second state if the signal quality measurements are above the first threshold but below a second threshold; and
      a third state if the signal quality measurements are above the second threshold.
11. The method of embodiment 1, wherein:
   the resume request comprises a configuration for the one or more SCells and/or the one or more further SCells to be added; and
   the indication is part of the configuration.
12. The method of any of embodiments 1-11, further comprising:
   determining, upon resuming the connection, if the UE is in the same area as when the suspend request was received;
   if it is determined that the UE is in the same area, placing the one or more SCells in the second SCell states according to the indication; and
   if it is determined that the UE is not in the same area, removing the one or more SCells from the connection.
13. The method of any of embodiments 1-12, further comprising, in response to the suspend request, sending the first SCell states to the network node.
14. A method managing secondary serving cells (SCells) of a user equipment (UE), the method comprising:
   establishing a connection with the UE via a plurality of configured cells, the configured cells including a primary serving cell (PCell) and one or more SCells, wherein the SCells have respective first SCell states;
   sending, to the UE, a request to suspend the connection;
   sending, to the UE, a request to resume the connection, the resume request comprising indication of second SCell states for one or more of the following: the one or more SCells, and one or more further SCells to be added to the configured cells upon resuming the connection.
15. The method of embodiment 14, wherein the indication indicates that, upon resuming the connection, the UE should use the stored first SCell states as the second SCell states for the one or more SCells.
16. The method of any of claims 14-15, wherein the absence of the indication indicates that the UE should use a default state as the second SCell states for the one or more SCells.
17. The method of embodiment 14, wherein the indication comprises a first plurality of bitmap fields.
18. The method of embodiment 17, wherein:
   the first plurality corresponds to the number of possible states for an SCell;
   each bitmap field corresponds to one of the possible states for an SCell; and
   each bitmap field indicating which of the one of more SCells should be placed in the corresponding SCell state upon resuming the connection.
19. The method of embodiment 18, wherein the first plurality comprises first and second bitmap fields.
20. The method of embodiment 19, wherein:
   each bit of the first bitmap field indicates whether a corresponding one of the SCells should be placed in a first state or a second state upon resuming the connection; and
   each bit of the second bitmap field indicates whether a corresponding one of the SCells should be placed in the state indicated by the first bitmap field, or in a third state.
21. The method of embodiment 19, wherein, for each of the one or more SCells, a combination of a corresponding bit in the first bitmap field and a corresponding bit in the second bitmap field indicates the second SCell state for the particular SCell.
22. The method of embodiment 14, wherein the indication indicates that, upon resuming the connection, the UE should determine the second SCell states for the one or more SCells based on signal quality measurements.
23. The method of embodiment 14, wherein:
   the resume request comprises a configuration for the one or more SCells and/or the one or more further SCells to be added; and
   the indication is part of the configuration.
24. The method of any of embodiments 14-23, further comprising receiving the first SCell states from the UE in response to the suspend request.
25. The method of embodiment 24, further comprising determining whether to include the indication in the resume request based on the first SCell states.
26. A user equipment (UE) configured to manage secondary serving cells (SCells) of a connection in a wireless communication network, the UE comprising:
   communication circuitry configured to communicate with a serving node in the wireless communication network; and
   processing circuitry operatively associated with the communication circuitry and configured to perform operations corresponding to the methods of any of exemplary embodiments 1-13.
27. A user equipment (UE) configured to manage secondary serving cells (SCells) of a connection in a wireless communication network, the UE being arranged to perform operations corresponding to the methods of any of exemplary embodiments 1-13.
28. A non-transitory, computer-readable medium storing computer-executable instructions that, when executed by at least one processor of a user equipment (UE), configure the UE to perform operations corresponding to the methods of any of exemplary embodiments 1-13.
29. A network node, in a wireless communication network, configured to manage secondary serving cells (SCells) of one or more user equipment (UEs), the network node comprising:

communication circuitry configured to communicate with the UEs; and processing circuitry operatively associated with the communication circuitry and configured to perform operations corresponding to the methods of any of exemplary embodiments 14-25.

30. A network node, in a wireless communication network, configured to manage secondary serving cells (SCells) of one or more user equipment (UEs), the network node being arranged to perform operations corresponding to the methods of any of exemplary embodiments 14-25.

31. A non-transitory, computer-readable medium storing computer-executable instructions that, when executed by at least one processor of a network node, configure the network node to perform operations corresponding to the methods of any of exemplary embodiments 14-25.

The invention claimed is:

1. A method performed by a user equipment (UE) for managing secondary serving cells (SCells) in a wireless network, the method comprising:
   suspending the UE's connection with the wireless network in response to a suspend message from the wireless network, wherein:
      the connection is via a plurality of configured cells including a primary serving cell (PCell) and one or more SCells, and
      the one or more SCells have respective first SCell states prior to the suspension;
   receiving from the wireless network a message to resume the connection with the wireless network, wherein the resume message does not indicate states for the one or more SCells upon resuming the connection; and
   resuming the connection with the wireless network via the one or more SCells in response to the resume message, including placing each of the one or more SCells in a default state.

2. The method of claim 1, wherein the default state is one of the following:
   activated, deactivated, and dormant.

3. The method of claim 1, wherein:
   the resume message includes a configuration for one or more further SCells to be added to the configured cells upon resuming the connection; and
   the configuration indicates states for the one or more further SCells upon resuming the connection.

4. The method of claim 1, wherein placing each of the one or more SCells in the default state is based on absence from the resume message of an indication of states for the one or more SCells upon resuming the connection.

5. A user equipment (UE) configured to manage secondary serving cells (SCells) in a wireless network, the UE comprising:
   radio interface circuitry configured to communicate with the wireless network via one or more cells; and
   processing circuitry operably coupled to the radio interface circuitry, wherein the processing circuitry and the radio interface circuitry are configured to:
      suspend the UE's connection with the wireless network in response to a suspend message from the wireless network, wherein:
         the connection is via a plurality of configured cells including a primary serving cell (PCell) and one or more SCells, and
         the one or more SCells have respective first SCell states prior to the suspension;
      receive from the wireless network a message to resume the connection with the wireless network, wherein the resume message does not indicate states for the one or more SCells upon resuming the connection; and
      resume the connection with the wireless network via the one or more SCells in response to the resume message, including placing each of the one or more SCells in a default state.

6. The UE of claim 5, wherein the default state is one of the following: activated, deactivated, and dormant.

7. The UE of claim 5, wherein:
   the resume message includes a configuration for one or more further SCells to be added to the configured cells upon resuming the connection; and
   the configuration indicates states for the one or more further SCells upon resuming the connection.

8. The UE of claim 5, wherein the processing circuitry and the radio interface circuitry are configured to place each of the one or more SCells in the default state based on absence from the resume message of an indication of states for the one or more SCells upon resuming the connection.

9. A non-transitory, computer-readable medium storing program instructions that, when executed by processing circuitry of a user equipment (UE) configured to manage secondary serving cells (SCells) in a wireless network, configure the UE to perform the method of claim 1.

10. A method performed by a wireless network for managing secondary serving cells (SCells) of a user equipment (UE), the method comprising:
   sending to the UE a message to suspend a connection with the UE, wherein:
      the connection is via a plurality of configured cells including a primary serving cell (PCell) and one or more SCells; and
      the SCells have respective first SCell states;
   subsequently sending to the UE a message to resume the connection, wherein the resume message does not indicate states for the one or more SCells upon resuming the connection; and
   resuming the connection with the UE via the one or more SCells, wherein each of the one or more SCells is in a default state.

11. The method of claim 10, wherein the default state is one of the following: activated, deactivated, and dormant.

12. The method of claim 10, wherein:
   the resume message includes a configuration for one or more further SCells to be added to the configured cells upon resuming the connection; and
   the configuration indicates states for the one or more further SCells upon resuming the connection.

13. The method of claim 10, wherein each of the one or more SCells is in the default state, upon resuming the connection, based on absence from the resume message of an indication of states for the one or more SCells upon resuming the connection.

14. A wireless network configured to manage secondary serving cells (SCells) of a user equipment (UE), the wireless network comprising one or more network nodes, each network node comprising:
   communication interface circuitry configured to communicate with the UE; and
   processing circuitry operably coupled to the communication interface circuitry, wherein the processing circuitry and the communication interface circuitry are configured to perform the method of claim 10.

15. A non-transitory, computer-readable medium storing program instructions that, when executed by processing circuitry of one or more network nodes of a wireless network configured to manage secondary serving cells (SCells) of a user equipment (UE), configure the one or more network nodes to perform the method of claim 10.

* * * * *